(12) United States Patent
Li et al.

(10) Patent No.: US 7,844,118 B1
(45) Date of Patent: Nov. 30, 2010

(54) IMAGE SEGMENTATION SYSTEM AND METHOD WITH IMPROVED THIN LINE DETECTION

(75) Inventors: Xing Li, Webster, NY (US); Barbara Farrell, Ontario, NY (US); Peter McCandlish, Rochester, NY (US); Ryan Metcalfe, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/496,259

(22) Filed: Jul. 1, 2009

(51) Int. Cl.
*G06K 9/66* (2006.01)
(52) U.S. Cl. .................. 382/195; 382/181; 382/199; 382/205
(58) Field of Classification Search .............. 382/100, 382/181, 199, 205
See application file for complete search history.

(56) References Cited

U.S. PATENT DOCUMENTS

| | | | |
|---|---|---|---|
| 5,539,534 A * | 7/1996 | Hino et al. ................. 358/452 |
| 5,586,200 A * | 12/1996 | Devaney et al. ............. 382/232 |
| 6,178,260 B1 * | 1/2001 | Li et al. ..................... 382/173 |
| 6,347,153 B1 * | 2/2002 | Triplett et al. .............. 382/224 |
| 6,707,953 B1 | 3/2004 | Iida |
| 6,941,014 B2 | 9/2005 | Lin et al. |
| 7,280,253 B2 | 10/2007 | Li |
| 7,463,785 B2 * | 12/2008 | Ebisawa ..................... 382/266 |

* cited by examiner

*Primary Examiner*—Bhavesh M Mehta
*Assistant Examiner*—Stephen R Koziol
(74) *Attorney, Agent, or Firm*—Pillsbury Winthrop Shaw Pittman LLP

(57) ABSTRACT

Disclosed herein is a method for detecting thin lines in image data. The method is performed by a processor to process contone image data. The processing includes combining a first result of thin line detection using a first method and a second result of thin line detection using a second method to produce an improved thin line determination in the image data. The methods include processing and thresholding in the contone and binary domain to determine if a thin line exists in the window of image data. The thin line determination may also be merged with the image data as processed using other image segmentation techniques. The disclosed method produces better quality output images and reduces the addition of false lines in an image.

24 Claims, 12 Drawing Sheets

IMAGE SEGMENTATION SYSTEM AND METHOD WITH IMPROVED THIN LINE DETECTION

INCORPORATION BY REFERENCE

The present disclosure hereby incorporates by reference U.S. application Ser. Nos. 12/480,229 and 12/480,247, both filed on Jun. 8, 2009, in their entirety.

BACKGROUND

1. Field

The present disclosure is generally related to detecting thin lines in image data.

2. Description of Related Art

Image data comprises a number of pixels, each pixel corresponding to a defined location in the image. The pixels may have a number of components that contribute to defining the image, such as color and intensity. Binary image data has two possible values for each pixel, black (represented by the number "1") or white (represented by the number "0"). Binary images may also be represented as pixels that are "on" or "off" in color images where pixels are represented by color planes. Images that have a large range of shades are referred to as grayscale image. For example, grayscale images have an 8-bit value per pixel comprising 256 tones or shades of gray for each pixel in the image (gray level of 0 to 255). Grayscale image data may also be referred to as continuous tone or contone image data.

A technique for manipulating image data for output includes segmentation (or auto-segmentation). Generally, auto-segmentation techniques are known, and are used to select the most appropriate method to render the various object types (e.g., black and white or color images, text, photos, etc.) present in an image. In some segmentation techniques, separation modules are used to detect and separate text from objects of image data (e.g., photographs or other pictorial parts) so that text image data may be compressed and/or processed differently as compared to the object image data. Image segmentation plays an important role in delivering image quality for copy and scan services. While the technology for image segmentation has been improving over the years, some current methods in use still have limitations in a number of areas—the robustness in thin line detection being one of them. Sometimes, when robust separation of image and text/line art is needed, some kind of two-pass operation, such as auto-windowing, is used. These solutions, however, may not be suitable for all situations due to the cost and complexity associated with them. Also, such methods may not necessarily produce high quality images, as the detection of thin lines may be scarce or eliminated, thus reducing the output quality of the image data. Furthermore, known segmentation methods are sometimes incapable of accurately distinguishing edges from halftone dots or lines.

Therefore, a simpler, yet effective method for manipulating image data for output and for determining thin lines in input image data is desirable.

SUMMARY

An aspect of the present disclosure provides a method for processing image data. The method includes: receiving contone image data via an input device, the image data having a plurality of pixels; using a processor to process the image data and determine a presence of thin lines, the processing including:

(a) processing the image data using a first thin line detection method to determine a first result for the presence of thin lines, the processing including: establishing a window comprising a pixel of interest and neighboring pixels; determining a minimum value and a maximum value in a selected subset of pixels in the window; thresholding the pixel of interest and neighboring pixels of the window using thresholds; converting the pixels in the window, after thresholding, into a binary window of image data comprising a plurality of binary pixels, the binary pixels including a number of on and off pixels; determining characteristics associated with the on pixels in each row and column of the binary window; thresholding the characteristics associated with the on pixels and off pixels of the binary window; determining if a thin line exists in the window based on the thresholding of the characteristics associated with the on pixels and off pixels; and classifying the pixel of interest as an edge pixel that is part of a thin line if it is determined that the thin line exists;

(b) processing the image data using a second thin line detection method to determine a second result for the presence of thin lines, the processing comprising: establishing a window comprising a pixel of interest and neighboring pixels, the window comprising a plurality of predetermined regions; determining a minimum value and a maximum value of a selected subset of pixels in the window; thresholding the pixel of interest and neighboring pixels of the window using a first set of thresholds; counting a number of pixels in each of the predetermined regions of the window after applying the first set of thresholds; thresholding the counted number of pixels using a second set of thresholds; determining if a thin line exists in the window based on the thresholding of the counted number of pixels; and classifying the pixel of interest as an edge pixel that is part of a thin line if it is determined that the thin line exists and that the pixel of interest is part of the thin line; and combining the first result and the second result of the processed image data from the first thin line detection method and the second thin line detection method to produce a thin line determination in the image data.

Another aspect of the present disclosure provides a system for detecting thin lines in image data. The system includes an input device for receiving contone image data, the image data having a plurality of pixels; a processor configured to process the image data and determine the presence of thin lines; the processor including at least one thin-line detection module comprising code executable by the processor for performing a method including:

(a) processing the image data using a first thin line detection method to determine a first result for the presence of thin lines, the processing including: establishing a window comprising a pixel of interest and neighboring pixels; determining a minimum value and a maximum value in a selected subset of pixels in the window; thresholding the pixel of interest and neighboring pixels of the window using thresholds; converting the pixels in the window, after thresholding, into a binary window of image data comprising a plurality of binary pixels, the binary pixels including a number of on and off pixels; determining characteristics associated with the on pixels in each row and column of the binary window; thresholding the characteristics associated with the on pixels and off pixels of the binary window; determining if a thin line exists in the window based on the thresholding of the characteristics associated with the on pixels and off pixels; and classifying the pixel of interest as an edge pixel that is part of a thin line if it is determined that the thin line exists;

(b) processing the image data using a second thin line detection method to determine a second result for the presence of thin lines, the processing comprising: establishing a window comprising a pixel of interest and neighboring pixels, the window comprising a plurality of predetermined regions; determining a minimum value and a maximum value of a selected subset of pixels in the window; thresholding the pixel of interest and neighboring pixels of the window using a first set of thresholds; counting a number of pixels in each of the predetermined regions of the window after applying the first set of thresholds; thresholding the counted number of pixels using a second set of thresholds; determining if a thin line exists in the window based on the thresholding of the counted number of pixels; and classifying the pixel of interest as an edge pixel that is part of a thin line if it is determined that the thin line exists and that the pixel of interest is part of the thin line; and combining the first result and the second result of the processed image data from the first thin line detection method and the second thin line detection method to produce a thin line determination in the image data.

Yet another aspect of the present disclosure includes a non-transitory computer-readable medium including instructions that, when executed by a computer, cause the computer to perform a method including:

(a) processing the image data using a first thin line detection method to determine a first result for the presence of thin lines, the processing including: establishing a window comprising a pixel of interest and neighboring pixels; determining a minimum value and a maximum value in a selected subset of pixels in the window; thresholding the pixel of interest and neighboring pixels of the window using thresholds; converting the pixels in the window, after thresholding, into a binary window of image data comprising a plurality of binary pixels, the binary pixels including a number of on and off pixels; determining characteristics associated with the on pixels in each row and column of the binary window; thresholding the characteristics associated with the on pixels and off pixels of the binary window; determining if a thin line exists in the window based on the thresholding of the characteristics associated with the on pixels and off pixels; and classifying the pixel of interest as an edge pixel that is part of a thin line if it is determined that the thin line exists;

(b) processing the image data using a second thin line detection method to determine a second result for the presence of thin lines, the processing comprising: establishing a window comprising a pixel of interest and neighboring pixels, the window comprising a plurality of predetermined regions; determining a minimum value and a maximum value of a selected subset of pixels in the window; thresholding the pixel of interest and neighboring pixels of the window using a first set of thresholds; counting a number of pixels in each of the predetermined regions of the window after applying the first set of thresholds; thresholding the counted number of pixels using a second set of thresholds; determining if a thin line exists in the window based on the thresholding of the counted number of pixels; and classifying the pixel of interest as an edge pixel that is part of a thin line if it is determined that the thin line exists and that the pixel of interest is part of the thin line; and combining the first result and the second result of the processed image data from the first thin line detection method and the second thin line detection method to produce a thin line determination in the image data.

Other features, and advantages of the present disclosure will become apparent from the following detailed description, the accompanying drawings, and the appended claims.

BRIEF DESCRIPTION OF THE DRAWINGS

FIG. 6b illustrates a graphical representation of the method of FIG. 6a;

DETAILED DESCRIPTION

Figure 1:
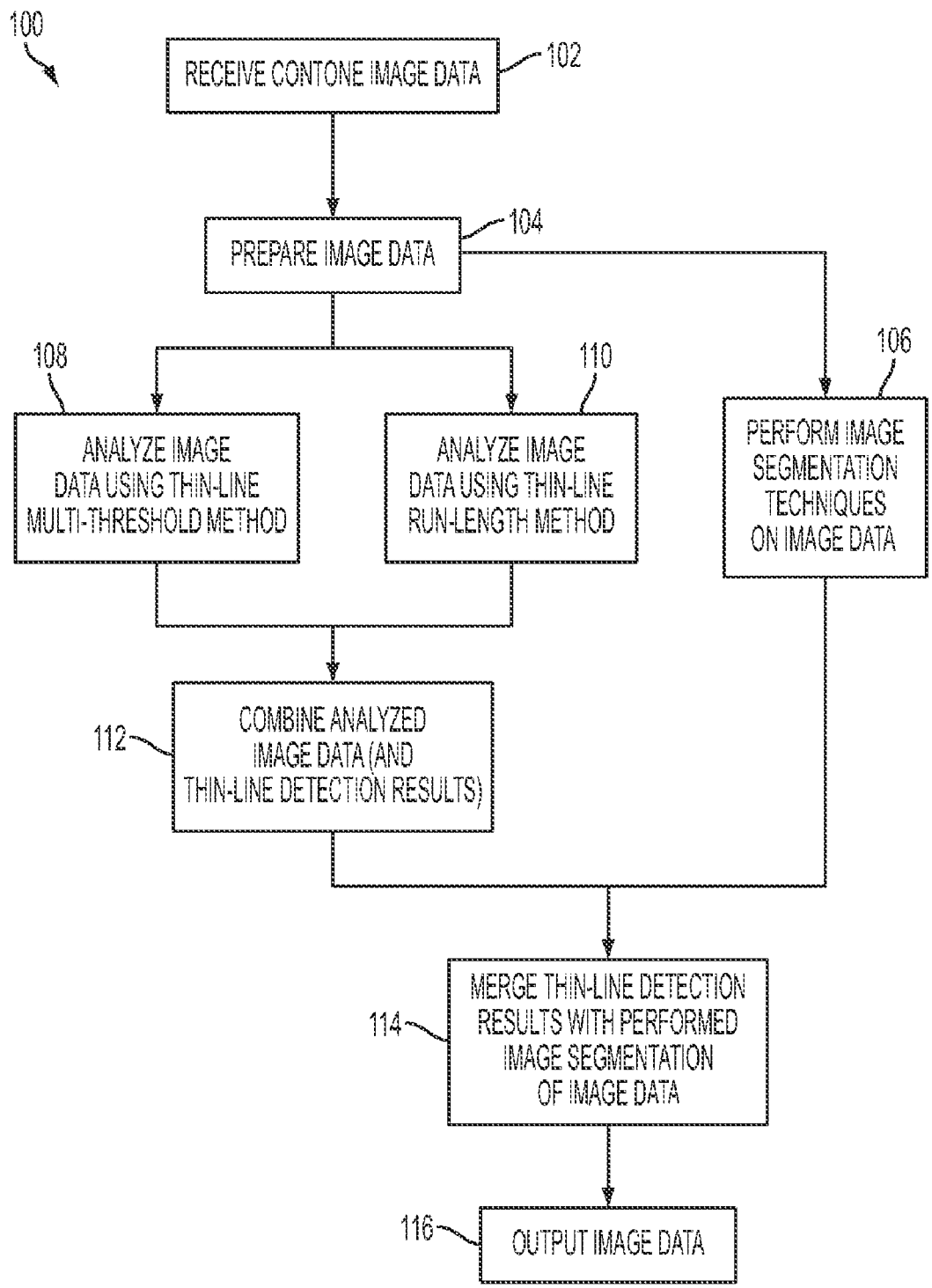
FIG. 1 illustrates a method for processing image data including detecting a thin line in the image data in accordance with an embodiment of the present disclosure.

This disclosure proposes a thin line detection algorithm with improved robustness for image data. As will become further evident in throughout the specification, a "thin line" is defined as pixels of similar value in image data that are provided in a sequence adjacent each other. More specifically, a regular edge or line in an image is defined in this disclosure as having multiple (e.g., more than 2) pixels wide. In some cases, the regular or thicker lines in an image may have pixels approaching a blackpoint minimum of the imaging or scanning device at its darkest point. In an embodiment, it is envisioned that a thin line is defined as comprising fractions that are 1 to 4 pixels (i.e., less than 4 pixels) wide and may be lighter than a regular line. A thin line, therefore—for explanatory purposes in this disclosure—is defined as comprising fractions of a number of pixels wide that are smaller than thicker lines, and, in some cases, may also comprise pixels that are lighter than pixels in a thicker line. The parameters for defining a thin line may be altered or set such that somewhat thicker lines may also be detected. For example, the parameters for a thin line may be set based on the types of lines (and number of pixels wide the lines are) present in the image data, based on the minimum types of points (e.g., such as when pixels are significantly lighter than a minimum point), based on light or dark values of pixels in image data, or based on factors in the type of image data that is generally input. As such, the definition for a thin line should not be limiting.

The disclosed method, system, and product is used for image segmentation. The method performs newly developed thin line detection by sharing prepared/context buffered image data with existing/other image segmentation methods. It also provides the option of using part of the existing segmentation result to condition the thin line detection result/determination, and allows for flexible merging of the thin line detection determinations with the segmentation tag.

More specifically, this disclosure combines two thin line detection algorithms to produce a thin line detection result to thereby provide an output image of greater quality. For example, this disclosure may implement similar integration concepts as disclosed for image segmentation in U.S. Pat. No. 6,941,014, issued Sep. 6, 2005 and assigned to the same entity of this disclosure (Xerox Corporation), hereby incorporated by reference in its entirety, but for merging or integrating thin line detection results from algorithms. The algorithms used for thin line detection herein complement each other by detecting characteristics related to thin lines, and thus their combination provides an image with improved thin line detection (such as compared to applying each individual algorithm in the image segmentation process to the input image data).

The method/algorithm described below includes a plurality of processor-implemented steps and incorporates the use of a number of variable thresholds. It is to be understood by one in the art that such thresholds and other variables may be programmable parameters, predetermined parameters, or parameters that are determined based on the input image data, and should not be limiting. The following describes an example of an embodiment.

FIG. 1 illustrates a method 100 for processing image data including detecting a thin line in the image data in accordance with an embodiment of the present disclosure. The method 100 begins when (contone) image data is received in step 102 via an input device (such as input device 202 of FIG. 2). The input image data comprises a plurality of pixels of the contone domain. The image data is then processed using a processor (such as processing module 204 shown in FIG. 2) to determine the presence of thin lines. In particular, this disclosure describes using a combination of two algorithms that each use a matrix to process the input image data and provide better output image quality. In an embodiment, each matrix may be viewed as a "window" that slides across and down an input image. A window may comprise a pixel of interest, i.e., the center pixel, that is to be processed/classified based on its neighboring pixels in the window, for example. Matrices or windows of any size (e.g., 5×5, 7×7) for processing the image data are within the scope of this disclosure.

Figure 2:
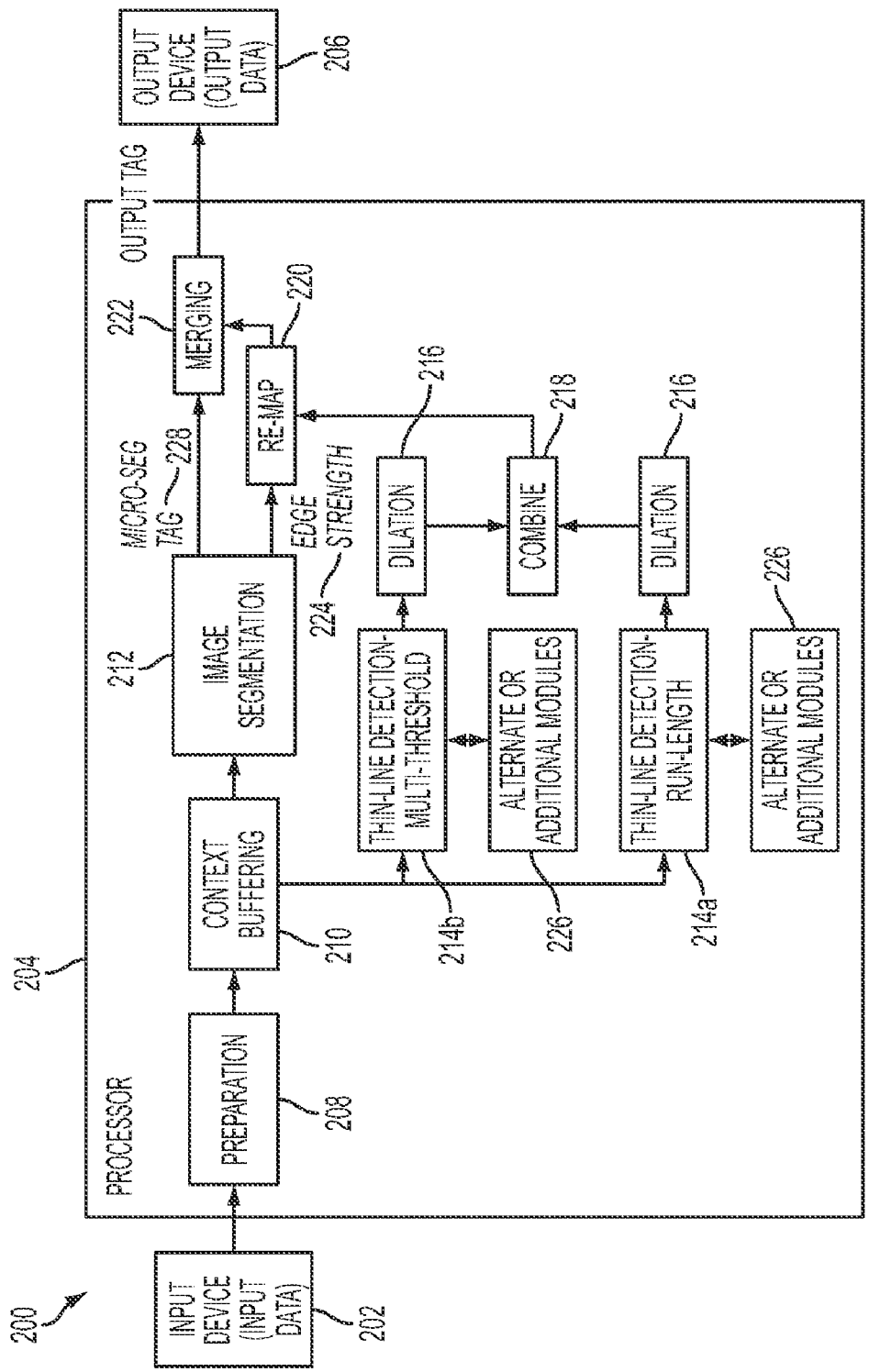
FIG. 2 illustrates an system that may be used to implement the method of FIG. 1 in accordance with an embodiment of the present disclosure.

As shown in FIG. 1, after receiving the contone image data in step 102, the image data is prepared in step 104 for processing. For example, in accordance with an embodiment, the image data may be processed—such as by a processor 204 as shown in FIG. 2—using at least two different algorithms to detect thin lines, in addition to image segmentation algorithms. In some cases, the image data may be prepared using a preparation module 208 and/or a context buffering module 210, for example, so that further processing may be performed. The image data is then processed using a first thin line detection method to determine a first result for the presence of thin lines and using a second thin line detection method to determine a second result for the presence of thin lines. More specifically, after the image data is prepared, the image data is processed and/or analyzed concurrently using a multi-threshold (fuzzy) thin line detection algorithm in step 108 (e.g., a first method) and a run-length thin line detection algorithm in step 110 (e.g., a second method) for producing a thin line determination. Such thin line detection algorithms are described in detail below with respect to FIGS. 3-11. More specifically, such a run-length thin line detection algorithm is described in U.S. application Ser. No. 12/480,229, filed Jun. 8, 2009, and a multi-threshold thin line detection algorithm is described in U.S. application Ser. No. 12/480,247, filed Jun. 8, 2009, both of which, as noted above, are herein incorporated by reference in their entirety.

As such, the method 100 processes/analyzes the image data using a multi-threshold thin line detection method in step 108 to produce a first result, processes/analyzes the image data using a run-length thin line detection in step 110 to produce a second result, while concurrently processing the image data using image segmentation techniques in step 106. Generally, image segmentation techniques may include, but are not limited to, other known, existing, or advanced algorithms for image data manipulation and/or other processing. For example, in some embodiments, mixed raster content (MRC) techniques which determine layers of image data representing a background layer, selector layer, and a foreground layer may be performed on the image data. Also, segmentation techniques may include classifying pixels in the image data into classes, such as pixels of continuous tone of different levels of smoothness, halftone pixels of different frequency, edge pixels, background pixels, etc. Some image segmentation techniques may also compute and export features such as edge strength. In any case, the image segmentation techniques and methods performed on the image data, in addition to the thin line detection algorithms described in detail below, should not be limiting and may include any known or new technique for processing image data.

Referring back to FIG. 1, after the image data is analyzed in steps 108 and 110 using the multi-threshold and run-length thin line detection methods and first and second results are determined, the analyzed image data and the thin line detection results are combined in step 112 to produce a thin line determination. For example, the edge map resulting from the multi-threshold method may be compared and/or combined with the edge map resulting from the run-length method. Of course, it should be understood, as described below with respect to system 200, that other techniques (e.g., dilation) may be applied for combination the thin line detection results.

In any case, the combined thin line determination results of step 112 may then be merged in step 114 with the image data processed using image segmentation techniques in step 106. Thereafter, the image data may be stored, further processed, or output via an output device, for example, as represented by step 116.

The method as described in FIG. 1 is used for all of the image data for the determination of thin lines thoughout. The methods are used in combination with existing image segmentation algorithms to further define an output image, for example. Generally, the thin line detection methods provide cost effective thin line detection algorithms that addresses the short comings of the known image segmentation method. It may also contribute to enabling a low cost implementation of an image path for products which may demand high image quality requirements. By combining features extracted from the contone domain and the binary domain and/or the thresholding as described in the multi-threshold detection method/the run-length detection method to determine the presence of thin lines (along with the other segmentation techniques), a better quality (output) image is produced.

Figure 13:
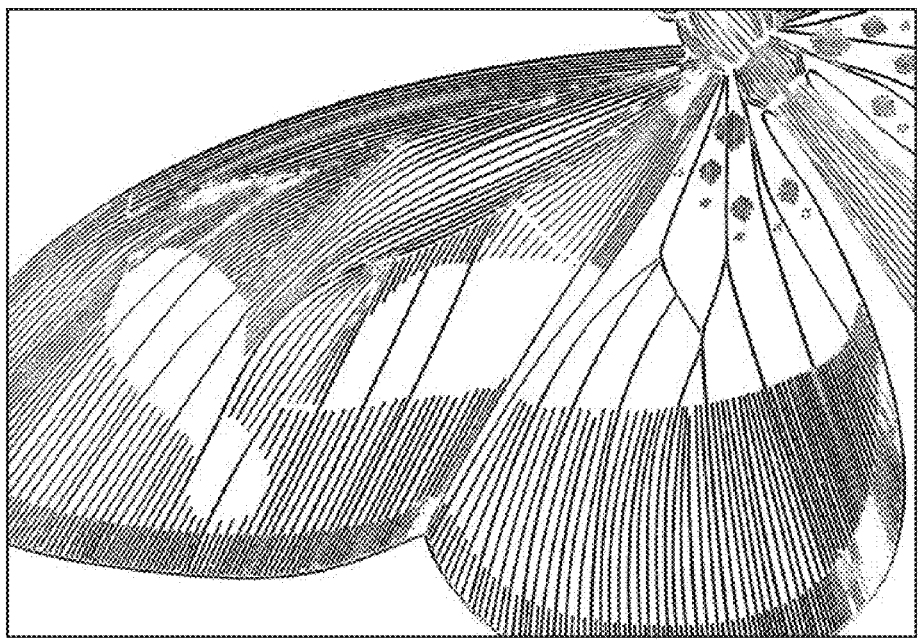
FIG. 13 illustrates an example of an edge map that may be generated after processing the input image of FIG. 12 using the method of FIG. 1.
Figure 12:
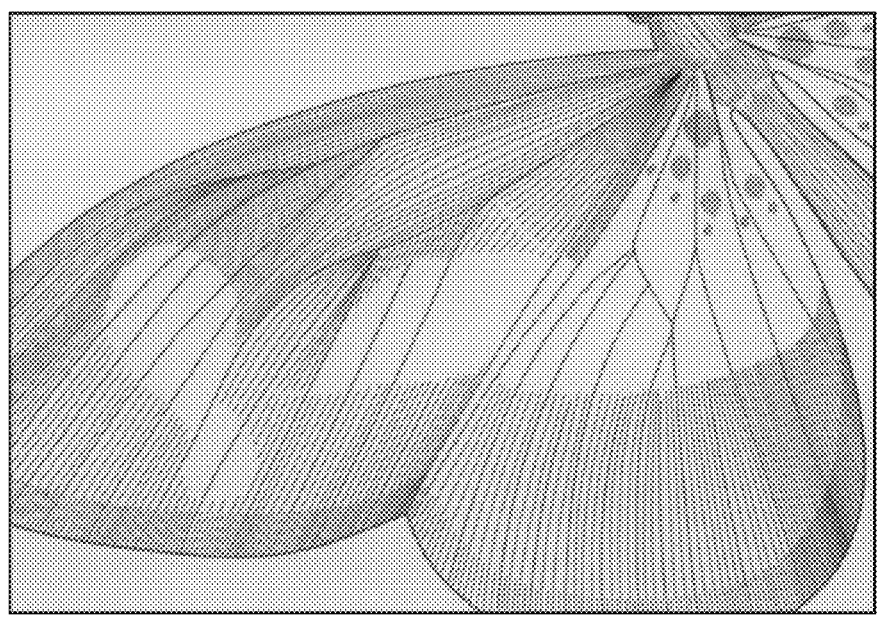
FIG. 12 shows an example of an input image that may be input for processing in accordance with an embodiment of the present disclosure.

Specifically, the combination of the two (first and second) thin line detection algorithms or methods offers much improved results in robustness of thin line detection over existing image segmentation methods alone. For example, the method 100 can detect thin lines missed by existing segmentation modules. FIG. 12 shows an example of an input image 1200 that may be received. Using some existing segmentation algorithms, an edge map including degraded or missing pixels for some of the thin lines that are present in the original image may be generated. Also, some existing segmentation algorithms may detect pixels in halftone area as edge pixels, but on the other hand miss many true edge pixels in thin line region. Using the proposed method, the resultant edge and thin line detection is significantly improved, as illustrated by the image edge map (also called an segmentation tag map) in FIG. 13.

Figure 15:
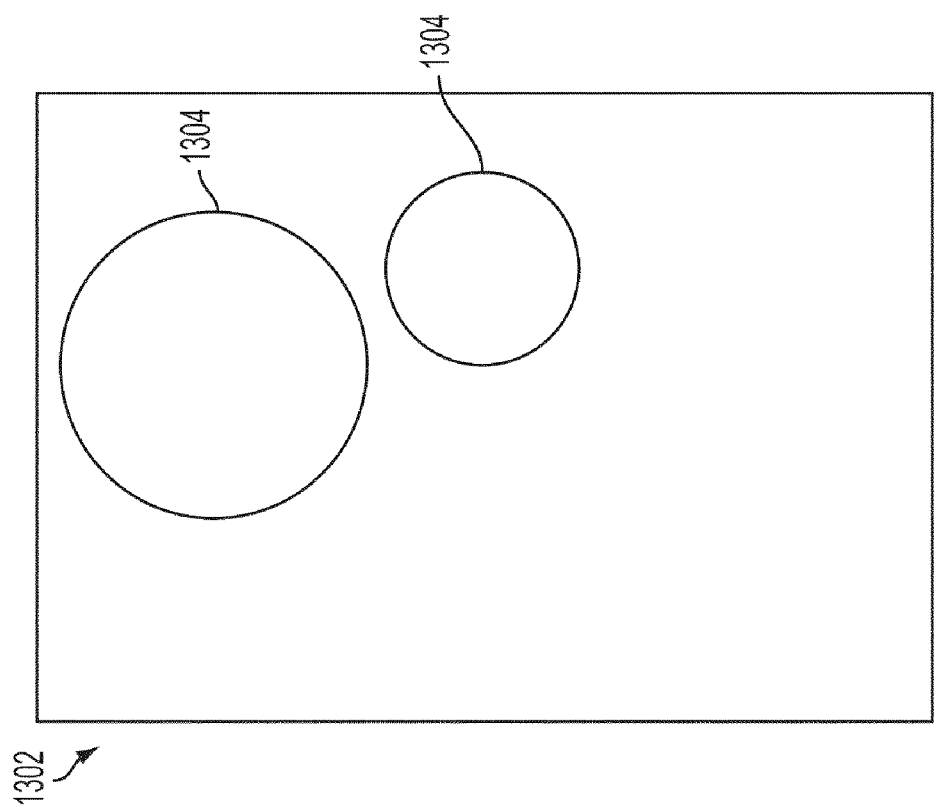
FIG. 15 illustrates an example of an edge map that may be generated after processing the input image of FIG. 14 using the method of FIG. 1.
Figure 14:
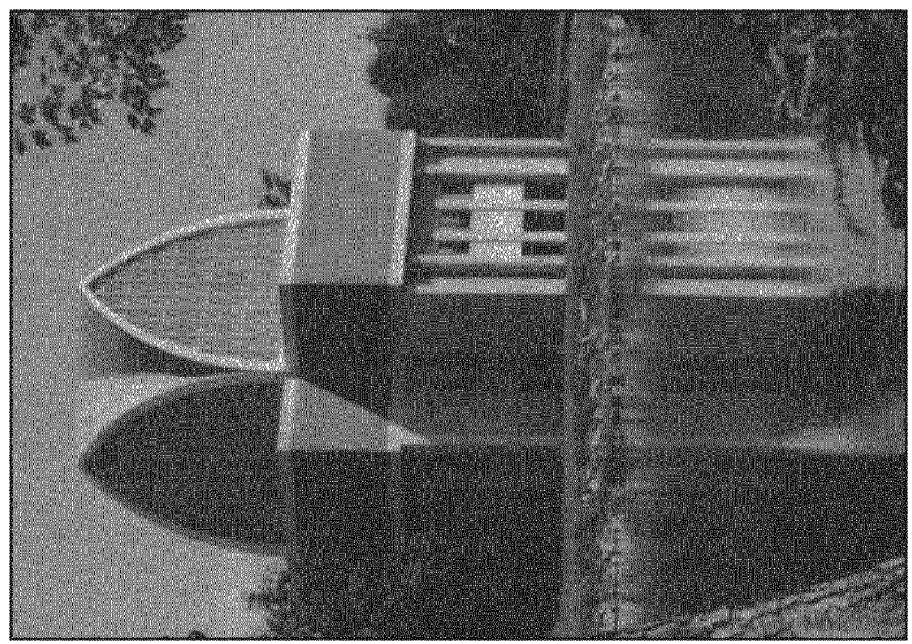
FIG. 14 shows another example of an input image that may be input for processing in accordance with an embodiment of the present disclosure.

Additionally, the noted algorithm or method 100 also allows for a less aggressive approach to edge detection, thus reducing or avoiding false alarms (e.g., adding a line where a line is not present). Such false alarms may be particularly noticeable when processing halftone image data, for example. FIG. 14 shows another example of an input image 1300. Using some existing segmentation algorithms, an edge map may be generated that determines the presence of thin lines in the image data that are not present in the original image. In particular, existing segmentation algorithms may detect pixels in halftone area as edge pixels, indicating thin lines, when lines are not present. Using the proposed method, the resultant edge and thin line detection is significantly improved, and false thin lines are not output, as illustrated by the image edge map 1302 in FIG. 15. For example, with the disclosed method, the edge map 1302 of FIG. 15 identifies pixels 1304 associated with a thin line, but false lines are not inserted.

Referring back to the thin line detection methods noted in the method 100 of FIG. 1, FIGS. 3-5 describe an example embodiment of a first thin line detection method, i.e., run length thin line detection process, of step 108 that may be performed on the image data. Specifically, the run-length method of step 108 uses adaptive thresholding to generate binary image data in order to analyze the locations, the number and the sizes of on runs in each row and column of a window of image data. "On" runs, as will become further evident, are defined as a sequence of pixels that are on in a window, such as after binarization. It also determines the variation from row to row and from column to column of a window being processed. It combines features extracted from the contone domain with the thresholding in the binary domain in making the detection decision that a pixel of interest is part of a thin line. The pixel of interest may be classified as an "edge" pixel or a "non-edge" pixel, such as by tagging the pixel. An "edge" pixel is a pixel in image data that is part of a line in the image data; a "non-edge" pixel is a pixel of image data that is not part of a line in the image data.

Throughout this disclosure the terms "on" and "off" are used with reference to describing pixels of image data in the binary domain. When referring to image data, the values associated with on and off may be determined by the state of processing the image data. For example, when image data is being manipulated or segmented, an on pixel may be defined as a pixel with a value of "0." Alternatively, in other embodiments, such as when image data is converted for output on a printer or machine, on pixels are recognized by a value of "1" (e.g., indicating presence of color or gray level for the printer to distribute ink). For purposes of the embodiments described herein, on pixels will be identified as pixels with a value of "0" (zero), and off pixels will be identified as pixels with a value of "1" (one) during processing. However, the term "on" and its value should not be limited.

The run length method/algorithm of step 108 as described in detail with respect to FIGS. 3-5 below includes a plurality of steps (e.g., processor-implemented) as well as a number of variable thresholds. It is to be understood by one in the art that such thresholds and other variables may be programmable parameters, predetermined parameters, or parameters that are determined based on the input image data, and should not be limiting. Further description regarding the variable and/or adaptive thresholds is also provided below. The following describes an example of an embodiment.

Figure 3:
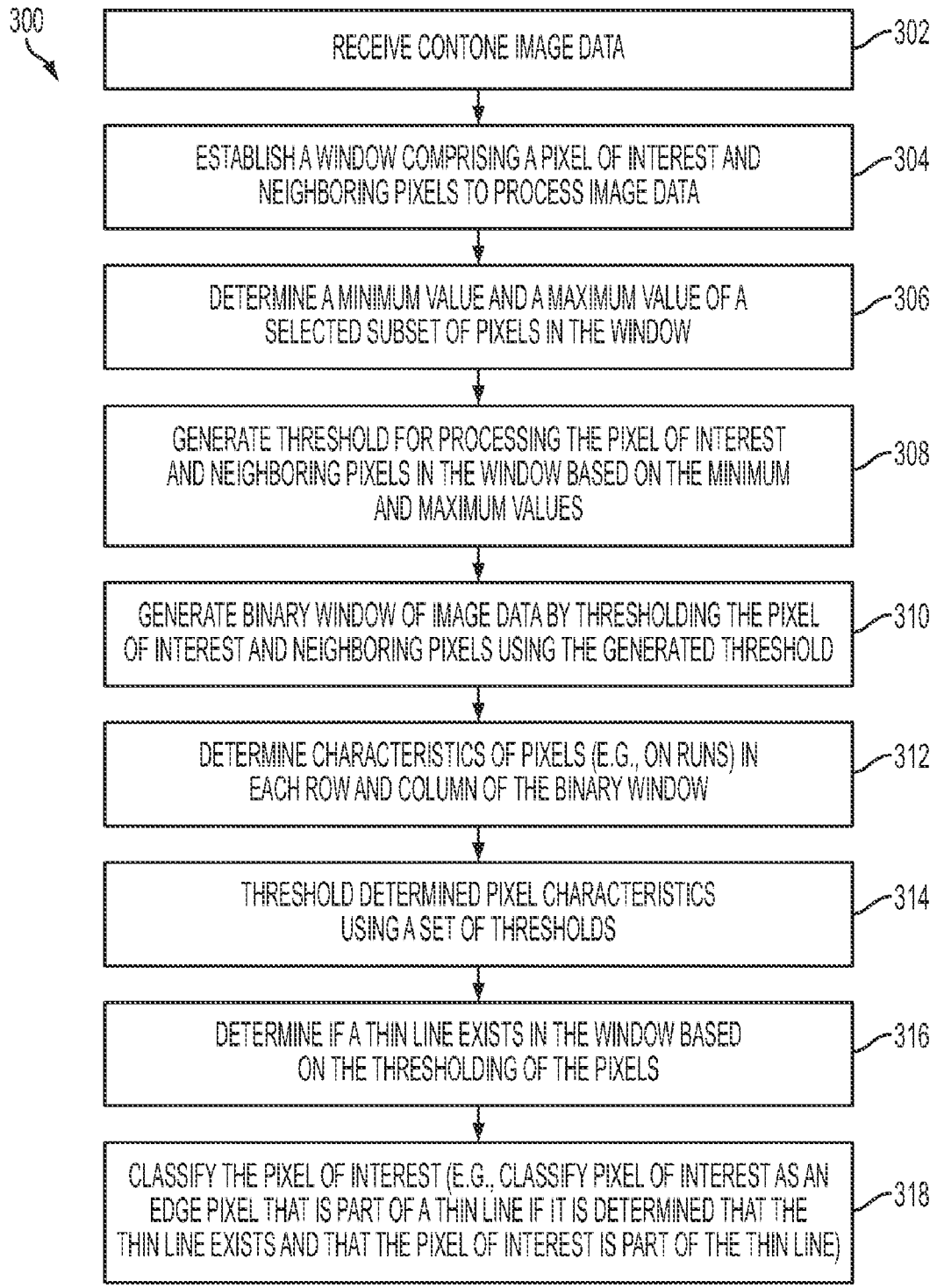
FIG. 3 illustrates a method for detecting thin lines in image data in accordance with an embodiment of the present disclosure.

FIG. 3 illustrates a run length thin line detection method 300 for detecting a thin line in image data in accordance with an embodiment of the present disclosure. The method 300 begins when contone image data is received in step 302 via an input device such as an input data device, preparation module, and/or context buffering module. The input image data comprises a plurality of pixels of the contone domain. The image data is then processed using a processor (such as detection module 214a of processing module 204 shown in FIG. 2) to determine the presence of thin lines. In particular, this algorithm uses a matrix to determine minimum and maximum values of pixels of image data, thresholds, and the like to thereby process the input image data in both contone and binary domains and provide better output image quality. In an embodiment, the matrix may be viewed as a "window" that slides across and down an input image. An example of such a window is illustrated in FIG. 4, represented by element 400. As shown, the window 400 may comprise a pixel of interest 402, i.e., the center pixel, that is to be processed/classified based on its neighboring pixels 404 in the window 400, for example. Though a matrix or window of 7×7 is used herein as an example in the run length thin line detection method 300, matrices or windows of other sizes are also within the scope of this disclosure.

As shown in FIG. 3, after receiving the contone image data in step 302, a window such as window 400 is established in step 304 by the processor. In some cases, such a window may be established by a run-length thin line detection module 214a that is part of the processor 204, as shown in FIG. 2. The window 400 comprises the pixel of interest 402 (i.e., a center pixel) and neighboring pixels. The window 400 is used for processing the pixels in the binary domain to determine the existence of a line in the image data. For example, as shown and described with reference to FIG. 5, after thresholding the pixels, a window 500 comprises a plurality of on and off pixels (e.g., pixels having values of "0" or "1"). These values, in particular the on or "0" pixels may produce a series of on runs which are used for analyzing the pixel of interest 402, further described below.

Referring back to FIG. 3, a minimum value and a maximum value in a selected subset of pixels in the window 400 is determined in step 306 using a min-max module or the thin line detection module 214a (e.g., which may include a min-max module), for example, after a window is established in step 304. That is, in the illustrated 7×7 window, there are 49 pixels provided for processing. A representative subset of pixels is chosen to determine a minimum value and a maximum value that are representative of the values in the window. The subset is chosen based on a possible location of a thin line. For example, a plurality of predetermined locations or a pattern of pixels in the window 400 may be determined as the subset based on the expectation that, if the pixel of interest is on a thin line, then some of the pixels in the selected subset will have lower values and some will have higher values. In some cases, the subset of pixels may comprise a plurality of darker/black pixel values and a plurality of lighter/white pixel values therein. For example, if the pixel of interest is on a thin line, pixels of varying gray levels are expected in the subset. In some embodiments, the selected subset of pixels includes a plurality of pixels in or adjacent a center region of the window. For example, a pattern of pixels in the center area may be selected while pixels along an outer perimeter are eliminated. Alternatively, in a possible embodiment, the selected subset of pixels may comprise a plurality of pixels from window 400 that are selected at random.

Figure 4:
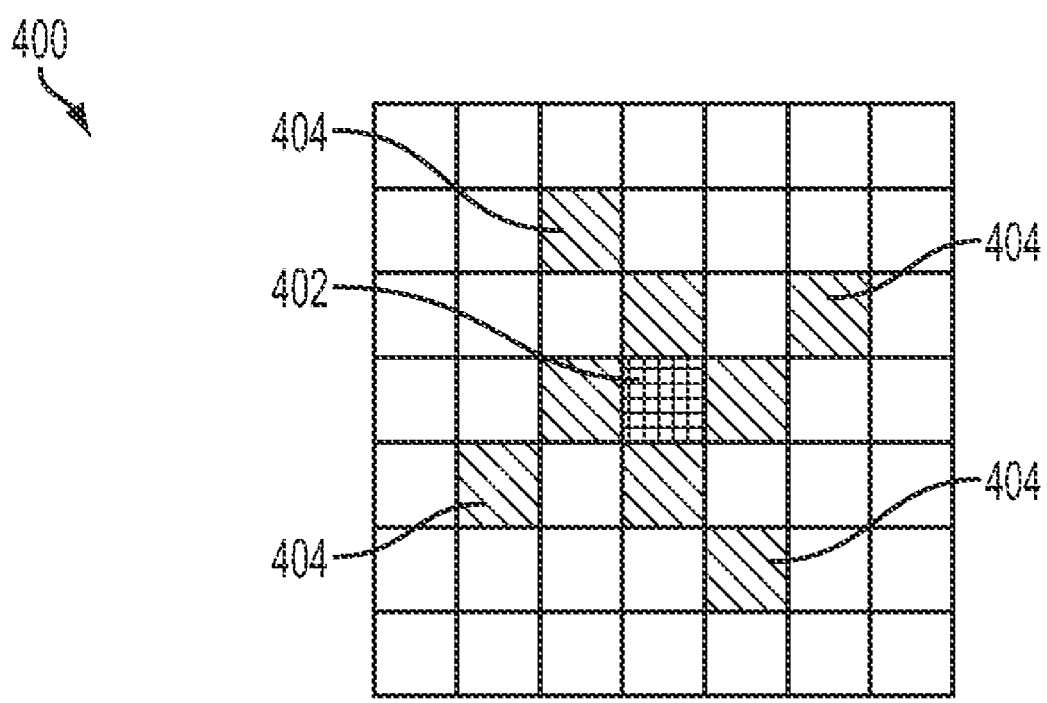
FIG. 4 illustrates an example of window used to process image data in accordance with an embodiment of the present disclosure.

FIG. 4 highlights an example embodiment showing the subset of pixels 404 used in minimum and maximum value calculation. The center pixel is identified as the pixel of interest 402. A plurality of pixels 404 in the window 400 are used to determine the minimum and maximum the subset. The subset of pixels 404 comprises a plurality of selected pixels in predetermined locations of interest (with respect to the thin line). This subset may include some of the darker pixels (i.e., lower value pixels) and some of the lighter/whiter pixels (i.e., higher value pixels) in the selected window 400. Of course, other ways of implementation are possible and within the scope of this disclosure.

Once the minimum and maximum values of the selected subset are determined in step 306 of method 300, the processor determines whether the following conditions are satisfied using the following formulas:

$$\text{maxOf9} - \text{minOf9} > \text{dif9} \qquad (1)$$

$$\text{maxOf9} > \text{high5} \times 5 \qquad (2)$$

Where:
maxOf9 is the maximum value of the subset of pixels 404 highlighted in FIG. 4;
minOf9 is the minimum value of the subset of pixels 404 highlighted in FIG. 4;
dif9 is a value representing a predetermined difference; and
high5×5 is a value representing the background (white) pixels.

That is, the processor determines: a) if the difference between the minimum and maximum values is greater than a predetermined difference; and b) if the maximum value of the subset is greater than a highest value. The comparison of the difference between the minimum and maximum values to the predetermined difference dif9 in condition (1) is performed to ensure that there is a possibility of a thin line within the window. For example, if the difference between the maxOf9 and minOf9 is a smaller value (i.e., the minimum and maximum values of the subset of pixels are close to each other) that is not greater than the predetermined difference dif9, it is determined that a thin line most likely does hot exist in the thin window currently being processed. Therefore, for condition (1), one would generally expect the difference between the minimum and maximum values to be a high value that is greater than a predetermined value. For example, a value for the background (e.g., paper) may be a high value (e.g., 255), whereas a value for one or more pixels indicating the presence of a thin line may be a lower value (e.g., 30). This high value, therefore, would be greater than the predetermined difference dif9.

The highest value high5×5 is used to identify the background, i.e., white, pixels in the subset of pixels. Condition (2) verifies that the pixels being processed are provided on a background of white, or a value close to white. Condition (2) compares the maximum value maxOf9 to the highest value high5×5. It is generally expected that the highest value high5×5 will be approximately as high as the paper white value, and may be any value that represents the highest value of white (in the window). Thus, in order to ensure that the pixels are provided on a background of white, the maximum value maxOf9 must be higher that the highest value high5×5. The highest value high5×5 is chosen based on a threshold value where one might expect paper to register in value (e.g., 0 to 255). For example, if paper registers at a value of 253, 254, or 255, highest value high5×5 may be set at a threshold of 252, so that when compared to the maximum maxOf9, one is ensured that the possible thin line is on a white background.

In some cases, the highest value high5×5 may be the same value as the maximum value maxOf9. Thus, the maximum value maxOf9 and highest value high5×5 are equal. In an embodiment as noted above, condition (2) is not met, and the pixel of interest is not determined to be a part of the thin line (and so, a new pixel of interest may be chosen). However, it is envisioned in possible embodiments that condition (2) may be defined as maxOf9>=high5×5. In this case, an equal condition (i.e., maxOf9=high5×5) would satisfy condition (2) and thus further algorithm processing would be performed. Though a more satisfactory value for high5×5 would most likely be greater than maxOf9 by at least one gray level value, either determination may be used. More specifically, in some cases, threshold value(s) may be set accordingly to achieve the effect of maxOf9 being greater than threshold(s).

The difference dif9 and highest value high5×5 may be chosen based on what one would normally expect in a window having a thin line and background paper values. That is, the steps used in the method, or that are implemented by the system, may be a "smart" method or system, defined by its capability to use rules and logic to determine if the pixels/values are associated with a line or a background, and/or the like. In an example embodiment, the predetermined difference dif9 and the highest value high5×5 are each values that are pre-programmed and/or chosen based on experience (e.g., such as historical data). For example, one may anticipate ranges or values that are associated with darker/black pixels, as well as ranges or values that are associated with lighter/white pixels. Alternatively, in an embodiment, it is envisioned that the method (or system) 300 may adapt to the image data that is received as input image data to determine the ranges or values that are associated with determining that the conditions are met. Any of these associations or anticipations may be used to assist in choosing the variables dif9 and high5×5. However, the methods or strategies for choosing such values for comparison in conditions (1) and/or (2) should not be limiting.

If conditions (1) and (2) are both met, the processing of the image data in method 300 continues as described with reference to FIG. 3. However, if conditions (1) and (2) are not met, processing of the image data does not continue. Rather, a new window is established (i.e., the window is traversed or moved across or down the image data), and the subset, minimum and maximum values, and conditions are evaluated for the new window with a new pixel of interest and its neighboring pixels. Each window is processed by determining these values and that these conditions (1) and (2) are met. By determining the minimum and maximum values based on a subset of pixels in each window, the present disclosure is capable of using variable or adaptive values when processing the image data. More specifically, when conditions (1) and (2) are satisfied, the minimum and maximum values of a window may be used to generate adaptive thresholds for further processing of the image data.

After step 306 and satisfying the conditions (1) and (2) associated therewith, the processor is then used in step 308 to determine or generate a threshold for processing the pixel of interest and neighboring pixels in the window based on the minimum and maximum values. Thresholding the pixels in the window generates a window of pixels in a binary domain, i.e., comprising on and off pixels. For example, the processor uses the following formula:

binThreshold=(maxOf9+minOf9)>>1+thresholdOffset

Where:

binThreshold is a value for thresholding the pixels in the window thresholdOffset is an offset value That is, the processor generates a binThreshold for processing the pixels in the window. Specifically, this formula determines the binThreshold calculating an average of the maximum value and minimum value of the selected subset of the window (i.e., the summation of maxOf9 and minOf9 is divided by two). An offset value thresholdOffset is then added to this average to determine the binThreshold.

In an embodiment, the thresholdOffset is a value that is pre-programmed and/or chosen based on experience (e.g., such as historical data). The determined threshold binThreshold may include a threshold value that is used for fine adjustment (e.g., an average of a low threshold and a high threshold) and flexibility, as learned in the art. Because the binThreshold is determined based on the minimum and maximum values, which are variable with respect to the values of the pixels in the window, the binThreshold also comprises a variable or adaptive threshold. That is, the determined threshold binThreshold for processing the pixel of interest and its neighboring pixels is variable as the window is moved along the image data.

After the threshold value binThreshold is determined in method 300, the pixel of interest and neighboring pixels of the window 400 are then thresholded in step 310 by the processing module using the generated threshold binThreshold. In an embodiment, the following formula is used:

If contone pixel>=binThreshold then set the binary pixel to 1; otherwise 0.

Using such an equation, for example, produces a binary window of data. An example of a binary window is shown by window 500 in FIG. 5, which includes a plurality of on pixels 504 (or pixels with a value of "0") and a plurality of off pixels 502 (or pixels with a value of "1"). For example, in an embodiment, for each of the pixels in the window, the binThreshold may be applied to determine if a pixel value is greater than, equal to, or less than a determined threshold. Pixels that exceed or are equal to a binThreshold are defined as on pixels, and are considered to have a value of "0" with respect to a binary domain. Pixels that are less than a threshold are defined as off pixels, and are considered to have a value of "1" with respect to the binary domain.

In a sense, binary concepts are used to analyze the image data. For example, in a binary image, a pixel is either on or off (i.e., has a value of 0 for black or on pixel; 1 for white or off pixel). In this case, the binThreshold is used to determine if a pixel in the window is on or off, so that the on pixels may be further processed. However, it should be noted that conversion of the image data from contone to binary is not necessary. Rather, the concept of determining if a pixel is included or not included (i.e., yes or no) for further processing is applied during thresholding in step 310.

After applying the threshold binThreshold, the method proceeds to step 312. Step 312 determines characteristics related to the binary pixels provided in the window of binary image data. Specifically, the characteristics that may be determined are related to one or more on runs that may be present in the binary window. A "run" is defined as a succession of pixels of all one color or value. A "run length" is defined as a number of pixels in a run. In this case, an "on run" is defined as a number or sequence of adjacent binary on pixels in a window. As noted above, the value associated with the term "on" should not be limited. In any case, after the thresholds are applied, the number of on pixels (e.g., elements 504 in FIG. 5) is analyzed to determine possible thin line features and related characteristics.

In an example embodiment, each row and column of the binary window 500 is analyzed to determine the characteristics that are related to the on runs. For example, for each row, the number of on runs, their start location(s) and end location(s), and the run length associated with the on run(s) in the window may be counted and/or recorded. A similar calculation may be performed for each column in the window as well. Additionally, the characteristics of pixels (e.g., on runs) may be determined for each row and/or column in relation to the window of image data. Thresholding on runs, as described in step 314 below, may also assist in determining characteristics related to the on runs. For example, characteristics related to on-runs in each row may be compared to characteristics among all of the rows in the window to determine the relationship of the on runs with respect to each other. A comparison such as this may allow for a determination of an orientation of a line, such as an existence of a vertical to 45 degree line in the window. As another example, characteristics associated with each column may be compared among characteristics of all of the columns to determine an existence of a horizontal to 45 degree line. Additionally and/or alternatively, other characteristics related to on runs may include determining variations, locations, and properties (e.g., broken sequence in on runs/lines) in a row and/or column and any associated determinations (i.e., too big, too small, not long enough) or conditions that may be associated with the existence of a thin line in the window of image data. Examples of the characteristic determinations and methods for thresholding the characteristics are described below. Of course, the characteristics of the binary window of image data to be determined should not be limiting.

After determining/calculating the characteristics of the pixels and on runs of the window 500 of binary data, the determined pixel characteristics are thresholded in method 300 using a set of thresholds at step 314. Generally, such thresholds may be programmable and variable parameters that may be chosen based on experience (e.g., historical data). These thresholds may be based on features that a thin line may have. For example, one may anticipate that a minimum number of pixels and related characteristics are associated with a thin line being present in a window. Alternatively, in an embodiment, it is envisioned that the method (or system) may adapt to the image data that is received. Additionally, thresholding may include using comparisons (such as comparing on runs from row to row or column to column in a window) and anticipated characteristics of lines. Any of these associations or anticipations may be used to assist in choosing the second set of thresholds and should not be limiting.

In an embodiment, the thresholding of step 314 may comprise comparing the number and characteristics of non-zero items (i.e., off or "1" pixels) to the determined characteristics of the on pixels in the binary window. For example, a total number of non-zero items in the rows and columns of the window (e.g., vertical and horizontal) may be determined. In an embodiment, the thresholding of step 314 may include determining that the characteristics of the on runs meet or exceed predetermined requirements or conditions. The thresholding at step 314 allows one to determine if conditions are met to indicate the possible presence or existence of a thin line in the window.

Thus, once the pixels are thresholded in method 300, it may be determined if a thin line exists in the window in step 316. Thereafter, step 318 classifies the pixel of interest. Specifically, if it is determined that the thin line exists in step 316, and that the pixel of interest in the window is part of the thin line, the pixel of interest is classified as an edge pixel in step 318. Alternatively, the pixel of interest may be classified as a non-edge pixel if it is determined that a thin line does not exist in step 316, or if it is determined that the pixel of interest is not a part of the thin line. For example, it may be determined that a thin line does not exist in the window if the determined pixel characteristics do not meet a set of thresholds and/or conditions. It may also be determined that the pixel of interest (i.e., center pixel) is not a part of the thin line (e.g., the thin line appears in a different region of the window).

After classifying the pixel of interest in step 318, the processing of the image data may begin again by establishing a new window in step 302.

In some embodiments, the pixel of interest may be classified by a tag. Generally, the application of a tag to a pixel is known in the art. In this case, the tag may be used to aid in developing an edge map of the image data—i.e., map illustrating the pixels that are included in thin lines or edges throughout the image. A tag may indicate that a pixel is an edge pixel or a non-edge pixel. Tags may also only be used to indicate that the pixel is an edge pixel. However, such tagging of the image data need not be provided, and their indications need not be limiting.

Figure 5:
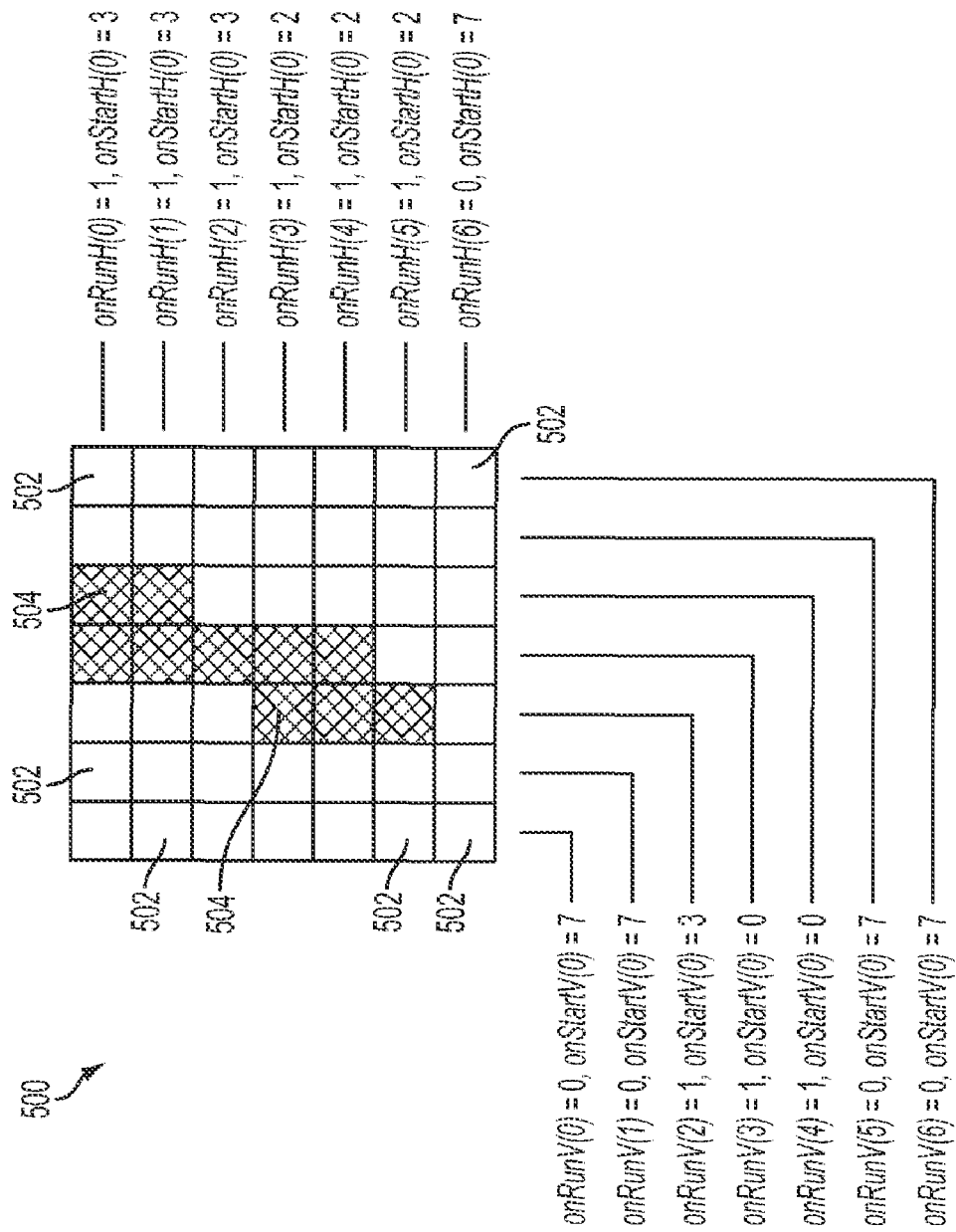
FIG. 5 illustrates an example of a plurality of on-runs of binary data of the window of FIG. 3 for analyzing and processing pixels.

FIG. 5 illustrates an example of a 7×7 binary window 500 of image data with a plurality of on runs therein provided after thresholding the window 400 of contone image data, such as in step 310 of method 300. As shown, a plurality of on runs of multiple sizes is provided in the window 500. In order to determine the on runs and their characteristics as presented in steps 312 and 314 of the method 300, the processor may first count the number of binary on pixels in each row and column to determine if an on run exists, and, if so, the number of pixels associated with its run length. For example, the following formulas may be used by the processor to determine the on runs:

onRunH(i) records a number on runs in the ith row
       (horizontal) in the 7×7 window onRunV(j) records a number on runs in the jth column
       (vertical) in the 7×7 window For example, the 7×7 window may comprise a plurality of horizontal rows labeled rows 0 (zero) to 6 (six), and a plurality of vertical columns labeled 0 (zero) to (6). As shown in FIG. 5, the first row 0 (zero) may have one on run, i.e., onRunH(0)=1. Similarly, the first column 0 (zero) may have no on runs, i.e., onRunV(0)=0. In the example of FIG. 5, either one or none are found. However, it should be noted that two or more on runs may be found per row or per column.

The processor may also determine a start location of each of the on run(s) in each row and column using the following formulas:

onStartH(i) records a start location in the ith row in
       the 7×7 window from left onStartV(j) records a start location in the jth column
       in the 7×7 window from top That is, in this example embodiment, from the leftmost portion of the window (e.g., from column 0 (zero), a start location of an on run is determined in a row. As illustrated in FIG. 5, the first row 0 (zero) has one on run that starts at column 3; i.e.; onStartH(0)=3. Also, in this embodiment, the start locations of on runs for columns are determined from a topmost portion (e.g., from row 0 (zero)). For example, the first column 0 (zero) may have no on runs. In one implementation, for rows and/or columns with no on runs, the start location may be assigned a value that is outside of the window, i.e., seven (7). As such, referring to the embodiment of FIG. 5, the start value may be set to seven (7), i.e., onStartV(0)=7. For example, the start location/value for the on run may be based on the window size (e.g., window is 7×7, start value for no on runs is 7). As such, this implementation should not be limiting.

Additionally, to determine a run length, an end location of each of the on runs in each row and column may be determined by the processor using the following formulas:

onEndH(i) records an end location in the ith row in
       the 7×7 window from left onEndV(j) records an end location in the jth column
       in the 7×7 window from top Again, in this example embodiment, from the leftmost portion of the window (e.g., from column 0 (zero), an end location of an on run is determined in a row. For example, in FIG. 5, the first row 0 (zero) has one on run that end at column 4, i.e., onStartH(0)=4. Also, the end locations of on runs for columns are determined from a topmost portion (e.g., from row 0 (zero)).

Using these values, the processor determines the run length of the on run(s) in each row and column of the window 500. For example, the following formulas may be used:

runLengthH(i) records a run length in the ith row in
       the 7×7 window runLengthV(j) records a run length in the jth column
       in the 7×7 window Because multiple on runs may be present in each row and/or column, a plurality of run lengths may be determined (each associated with a run). It should be noted that the determination of the presence of an on run, its start location, and end location, need not be performed in any particular order or the order noted above. That is, the start and end locations of on pixels may be first determined to determine if any on runs exist in the row/column, or, the start location, end location, and the presence of an on run may be determined simultaneously.

In some cases, an on run may include a single pixel. Alternatively, a plurality of pixels (e.g., 2 or more) may form an on run. For any rows and/or columns with no on runs, such as the first and last two columns of window 500, or the last row of window 500, the start location of the on run, i.e., on StartH(i) or on StartV(j) is set to a value of seven (7). Again, this is just one possible implementation and other determinations or values may be used.

Additional characteristics and determinations associated with the on runs may also be calculated. For example, the processor may use the following formulas to determine values associated with the pixels for determining the presence of a line:

If there are 7's in the middle of non-7's then brokenH
       is set to 1

If 7 is at both ends for the rows, middleH will be set
       to 1

If there are 7's in the middle of non-7's then brokenV is set to 1

If 7 is at both ends for the columns, middleV will be set to 1

BrokenH is, represents a one-bit flag that is used to store intermediate detection results. The brokenH flag is used to indicate an area or 1 or location with no on runs (i.e., start value of 7) in the middle of non-7 rows. For example, the flag brokenH is used to indicate the presence of "empty" rows (i.e., a row with no on runs) in the middle of "non-empty" rows (i.e., rows with on runs). Similarly, the middleH flag is used to indicate a middle location between locations with no one runs (i.e., between rows having a start value of 7). The brokenV flag indicates a broken area or location with no on runs (i.e., start value of 7) in the middle of non-7 columns, and the flag middleV is set to indicate when non-empty columns (i.e., columns with on runs) are present in the middle and empty columns (i.e., columns with no on runs) at two ends (a middle location between locations with no on runs (i.e., between columns having a start value of 7).

After determining/calculating the characteristics of the on run(s) of the window 500, a plurality of thresholds are applied at step 314 to determine if a line exists in step 316 in method 300. Again, these thresholds are used to compare the on run characteristics to those that a detected thin line may have. For example, the following formulas may be applied by the processor:

(a) From the first i that onStartH(i) is not 7, and for all of the consecutive i's with onStartH(i) not 7, if any abs(onStartH(i+1)−onStartH(i)) is greater than startDistThresh, Or, if any abs(onEndH(i+1)−onEndH(i)) is greater than endDistThresh, Or, if any abs(runLengthH(i+1)−runLengthH(i)) is greater than runLengthDifThresh then set the flag distBigH to 1.

(b) From the first j that onStartV(j) is not 7, and for all of the consecutive j's with onStartV(j) not 7, if any abs(onStartV(j+1)−onStartV(j)) is greater than startDistThresh, or, if any abs(onEndV(j+1)−onEndV(j)) is greater than EndDistThresh, or, if any abs(runLengthV(j+1)−runLengthV(j)) is greater than runLengthDifThresh, then set the flag distBigV to 1.

Wherein:

startDistThresh is a threshold value that is used for processing the determined on run start location characteristics associated with the pixels in the binary window of image data endDistThresh is a threshold value that is used for processing the determined on run end location characteristics associated with the pixels in the binary window of image data runLengthDif Thresh is a threshold value that is used for processing the determined on run run length characteristics associated with the pixels in the binary window of image data distBigH is defined as an indication in which locations/run lengths of on runs from row to row are different and/or far apart (in relation to each other)

distBigV is defined as an indication in which locations/run lengths of on runs from column to column are different and/or far apart (in relation to each other)

Formula (a) applies thresholds to the characteristics associated with the rows of the window. For example, starting at the first row (e.g., topmost) in the window 500, for each row 0 to 6 that does not have a start value of 7 (i.e., for each row that has at least one on run), formula (a) compares the characteristics to a threshold (e.g., start location, end location, and run length of row to a startDistThresh, endDistThresh, and runLengthDifThresh, respectively). More specifically, for formula (a), the absolute value of the difference between the each characteristic value associated with row (i) and the corresponding value associated with row (i+1) is compared to the thresholds. It is determined if there is an indication in which locations/run lengths of on runs from row to row are different and/or far apart (in relation to each other). If the absolute value of the difference between the characteristics is greater than the associated threshold, then the flag distBigH is set to 1. That is, distBigH flags cases in which start locations of on runs from row to row are far apart, or in which end locations of on runs from row to row are far apart, or in which the run length of on runs from row to row are different. Such flags may indicate, for example, that a vertical line may not be present in the window.

Formula (b) applies thresholds to the characteristics associated with the columns of the window. For example, starting at the first column (e.g., leftmost) in the window 500, for each column 0 to 6 that does not have a start value of 7 (i.e., for each row that has at least one on run), formula (b) compares the characteristics to a threshold (e.g., start location, end location, and run length of column to a startDistThresh, endDistThresh, and runLengthDifThresh, respectively). More specifically, for formula (b), the absolute value of the difference between the each characteristic value associated with column (j) and the corresponding value associated with column (j+1) is compared to the thresholds. It is determined if there is an indication in which locations/run lengths of on runs from column to column are different and/or far apart (in relation to each other). If the absolute value of the difference between the characteristics is greater than the associated threshold, then the flag distBigV is set to 1. Similarly as noted above with respect to the rows/distBigH, distBigV flags cases in which start locations of on runs from column to column are far apart, or in which end locations of on runs from column to column are far apart, or in which the run length of on runs from column to column are different. Such flags may indicate, for example, that a horizontal line may not be present in the window.

The number of non-zero items or pixels 502 in window 500 may also or alternatively be used in step 314 to threshold the characteristics of the window 500 and its on run(s). That is, in addition to determining on pixels (e.g., pixels with a value of "0"), a total number of off pixels (or non-zero items with a value of "1") in the window may be determined. For example, the processor may use the following formula to record the total number of off items in all of the rows of the window:

offH=Σ(onRunH(i)≠0) OR offH=Σ(onRunH(i)!=0)

With the above formula, the sum of the rows (horizontal direction) having at least one on run is determined. More specifically, onRunH(i) records the number of on runs in the ith row. The evaluation in the above formulas determine if either on runs are present (yes, or a count of 1 for the row) or not present (no, or a count of 0 for the row). For each row having one or more on runs, the row is counted as 1. OffH records the sum of these counts, i.e., the sum of the number of rows that have one or more on runs. The formula does not sum the number of on runs in each row together, but, rather, how many rows have on runs in them. For example, if a row has three (3) on runs, it contributes (adds) a count of one to offH.

The processor may also use the following formula to record the total number of off items in the columns of the window:

$$offV=\Sigma(onRunV(j)\neq 0) \text{ OR } offV=\Sigma(onRunV(j)!=0)$$

With the above formula, the sum of the zero runs in each column (vertical direction) having at least one on run is determined. More specifically, onRunV(j) records the number of on runs in the jth column. The evaluation in the above formulas determine if either on runs are present (yes, or a count of 1 for the column) or not present (no, or a count of 0 for the column). For each column having one or more on runs, the column is counted as 1. OffV records the sum of these counts, i.e., the sum of the number of columns that have one or more on runs. The formula does not sum the number of on runs in each column together, but, rather, how many columns have on runs in them. For example, if a column has two (2) on runs, it contributes (adds) a count of one to offV.

These totals offH and offV may be used or thresholded to calculate or detect a presence of the thin line in a window. For example, the processor may be used to determine if the following condition is satisfied:

(3) If either of these conditions are met, a thin line may exist in the window:

Condition Set A
  offH>offThresh
  ΣonRunH(i)−offH<=onRunDif
  distBigH=0
  brokenH=0
  brokenV=0
  middleH=0
  The number of off (or "1") pixels>=marginWhiteThresh for both the 1$^{st}$ column and the last column in the binarized 7×7 window Condition Set B
  offV>offThresh
  ΣonRunV(j)=offV<=onRunDif
  distBigV=0
  brokenH=0
  brokenV=0
  middleV=0
  The number of off (or "1") pixels>=marginWhiteThresh for both the 1st row and the last row in the binarized 7×7 window
  Wherein:
  offThresh is a threshold value for processing the sum of off (or non-zero) pixels in the binary window, and is used to ensure a long enough line segment
  onRunDif is a threshold value for processing the on and off pixels in the binary window
  marginWhiteThresh is a threshold value for processing the pixels in the window against a margin threshold More specifically, if either all conditions in set A are met or if all conditions in set B are met, a thin line may exist. Condition set A is associated with the determined row characteristics, and is used to determine if vertical to 45 degree lines are present. Condition set B is associated with the determined column characteristics, and is used to determine if horizontal to 45 degree lines are present. If the characteristics of either the rows or columns are met, a decision may be made. For example, referring to condition A, the total number of off pixels offH must be greater than a threshold for consideration of the existence of a line. Also, for example, the difference between the total number of on runs and the total number of off items must be less than or equal to a difference threshold value onRunDif to indicate the possible existence of a thin line.

Also, it should be noted that these thresholds-offThresh, onRunDif, and marginWhiteThresh-may be programmable and variable parameters. For example, the values of such parameters may be chosen based on experience (e.g., historical data) or based on the values that are present in the window. In some cases, however, the thresholds may be adaptable or variable.

Generally, if condition A or condition B of condition (3) is satisfied, it is determined in step 316 that a line is found in the window. If neither condition A nor condition B of condition (3) are met, then it is determined in step 316 that a line does not exist in the window. Thereafter, as noted above, the pixel of interest may then be classified in method 300 as an edge pixel in step 318 if it is determined that the thin line exists (condition (3)). If condition (3) or (4) is met, the pixel of interest is classified as a non-edge pixel in step 318.

The pixel may be tagged based on its determination and the processing and windowing of the image data continues until the first thin line detection method determines a first result for the presence of thin lines in the image data. Similarly, the second thin line detection method, which may be performed concurrently while the image data is being processed to find a first result, is processed.

FIGS. 6A-11 describe an example embodiment of the second thin line detection method, i.e., multi-threshold thin line detection process, of step 110 that may be performed on the image data in method 100 of FIG. 1. Specifically, the multi-threshold (fuzzy) method uses multiple adaptively generated thresholds to count the number of "on" pixels in specification regions and in turn detect thin lines of different orientations. It combines features extracted from the contone domain in making the detection decision. If the counts or patterns meet the conditions for a thin line to exist, it is determined if a pixel of interest if part of the thin line. The pixel of interest may be classified as an "edge" pixel or a "non-edge" pixel, such as by tagging the pixel.

The multi-threshold method/algorithm 600 described below includes a plurality of steps as well as a number of variable thresholds. It is to be understood by one in the art that such thresholds and other variables may be programmable parameters, predetermined parameters, or parameters that are determined based on the input image data, and should not be limiting. Further description regarding the variable and/or adaptive thresholds is provided below. The following describes an example of an embodiment.

Figure 6A:
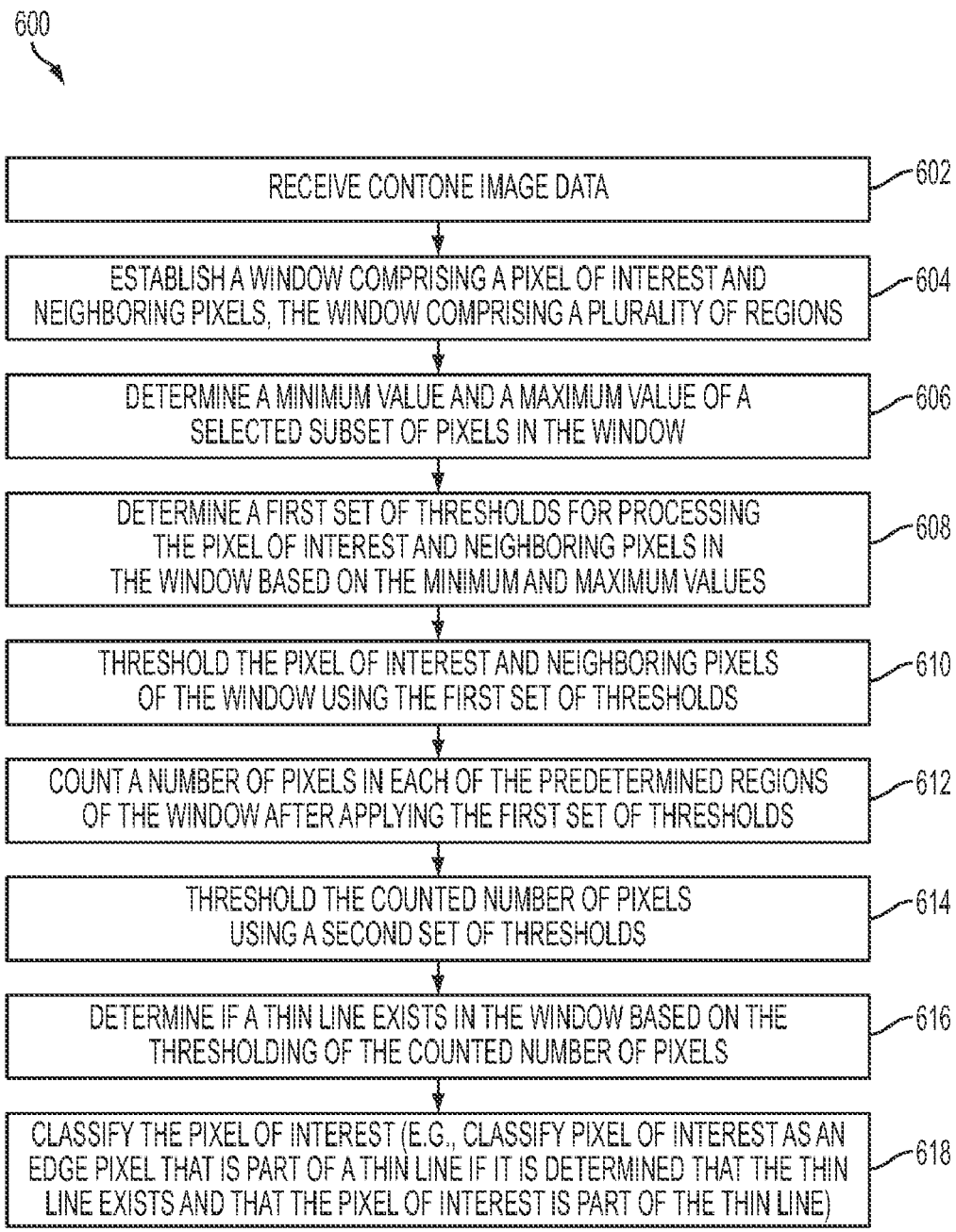
FIG. 6a illustrates a method for detecting thin lines in image data in accordance with an embodiment of the present disclosure.
Figure 7:
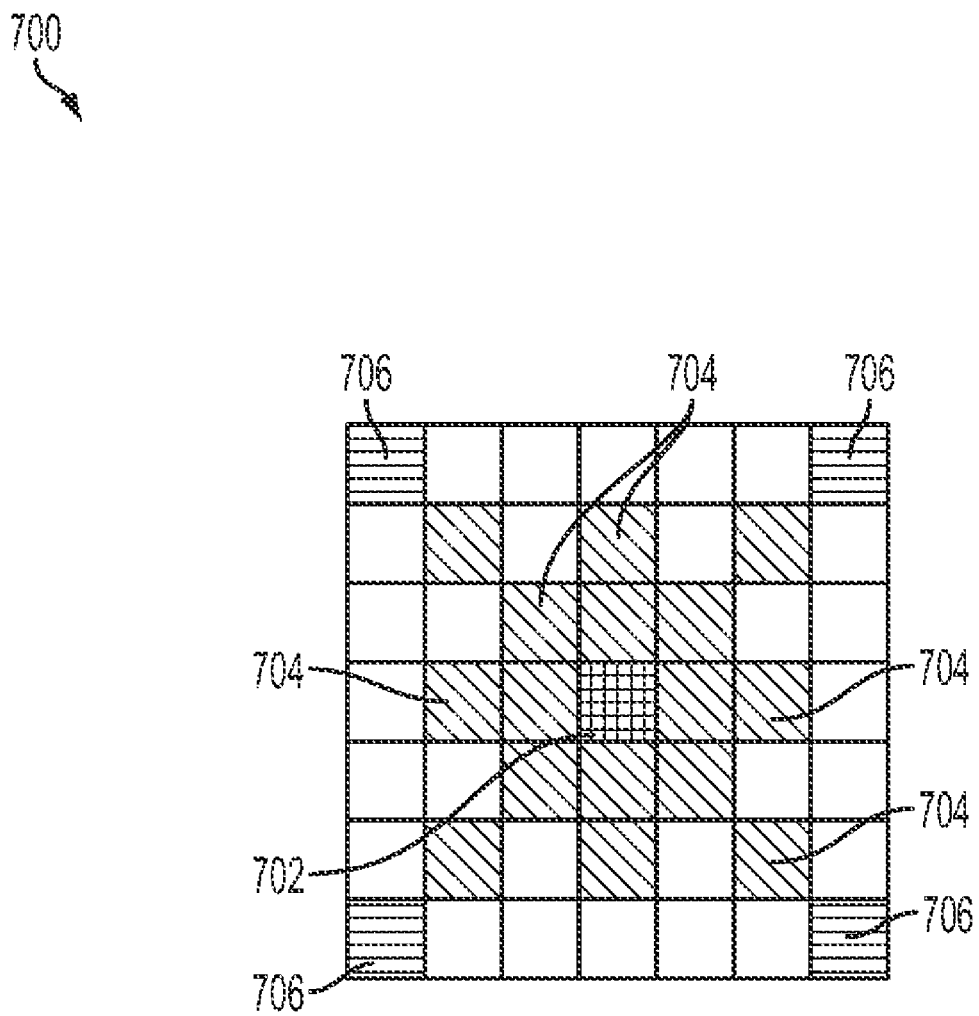
FIG. 7 illustrates an example of window used to process image data in accordance with an embodiment of the present disclosure.

FIG. 6a illustrates a multi-threshold (fuzzy) method 600 for detecting a thin line in image data in accordance with an embodiment of the present disclosure. The method 600 begins when contone image data is received in step 602 via an input device such as an input data device, preparation module, and/or context buffering module. The input image data comprises a plurality of pixels of the contone domain. The image data is then processed using a processor (such as detection module 214b of processing module 204 shown in FIG. 2) to determine the presence of thin lines. In particular, this algorithm uses a matrix to determine minimum and maximum values of pixels of image data, thresholds, and the like to thereby process the input image data and provide better output image quality. In an embodiment, the matrix may be viewed as a "window" that slides across and down an input image. An example of such a window is illustrated in FIG. 7, represented by element 700. As shown the window 700 may comprise a pixel of interest 702, i.e., the center pixel, that is to be processed/classified based on its neighboring pixels 704, 706 in the window 700, for example. Though a matrix or window of 7×7 is used herein as an example, matrices or windows of other sizes are also within the scope of this disclosure.

As shown in FIG. 6a, after receiving the contone image data in step 602, a window such as window 700 is established in step 604 by the processor in method 600. In some cases, such a window may be established by a multi-threshold thin line detection module 214b that is part of the processor, as shown in FIG. 2. The window 700 comprises the pixel of interest 702 (i.e., a center pixel) and neighboring pixels. The window 700 also comprises a plurality of predetermined regions. The number of regions for the window 700 should not be limiting. For example, in an example embodiment, the window may be divided into 9 regions, including an upper left region, an upper middle region, an upper right region, a bottom left region, a bottom middle region, etc. In some embodiments, the regions of the window may be determined based on the directionality for analyzing the image data in the window. For example, as shown and described with reference to FIGS. 7-11, multiple regions and directionalities may be analyzed for detecting a thin line in method 600.

After a window is established in 604, a minimum value and a maximum value in a selected subset of pixels in the window 700 is then determined in step 606 using a min-max module or the thin line detection module 214b (e.g., which may include a min-max module), for example, after a window is established in step 604. That is, in the illustrated 7×7 window 700, for example, there are 49 pixels provided for processing. A representative subset of pixels is chosen to determining a minimum value and a maximum value representative of the values in the window. The subset is chosen based on a possible location of a thin line. For example, a plurality of predetermined locations or a pattern of pixels in the window 700 may be determined as the subset based on the expectation that, if the pixel of interest is on a thin line, then some of the pixels in the selected subset will have lower values and some will have higher values. In some cases, the subset of pixels may comprise a plurality of darker/black pixels and a plurality of lighter/white pixels therein. For example, if the pixel of interest is on a thin line, pixels of varying gray levels are expected in the subset. In some embodiments, the selected subset of pixels includes a plurality of pixels in a center region and corner pixels of the window. Alternatively, in a possible embodiment, the selected subset of pixels may comprise a plurality of pixels from window 700 that are selected at random.

FIG. 7 highlights an example embodiment showing the subset of pixels 704-706 used in minimum and maximum value calculation. The center pixel is identified as the pixel of interest 702. A plurality of pixels 704 in the window 700 are used to determine the minimum and maximum of the subset, and a plurality of corner pixels 706 are used to determine a maximum value for the four corners of the window 700. The subset of pixels 704-706 comprises a plurality of selected pixels in predetermined locations of interest (with respect to the thin line). This subset may include some of the darker pixels (i.e., lower value pixels) and some of the lighter/whiter pixels (i.e., higher value pixels) in the selected window 700. Of course, other ways of implementation are possible and within the scope of this disclosure.

Once the minimum and maximum values of the selected subset are determined in 606 of method 600, the processor determines whether the following conditions are satisfied using the following formulas:

$$\text{maxOf5×5} - \text{minOf5×5} > \text{dif5×5} \tag{1a}$$

$$\max(\text{maxOf5×5}, \text{maxOf4Corners}) > \text{high7×7} \tag{2a}$$

Where:
maxOf5×5 is the maximum value of the subset of pixels 704;
minOf5×5 is the minimum value of the subset of pixels 704;
maxOf4Corners is the maximum value of the corner pixels 706;
dif5×5 is a value representing a predetermined difference; and
high7×7 is a value representing the background (white) pixels.

That is, the processor determines: a) if the difference between the minimum and maximum values is greater than a predetermined difference, and b) if the maximum value of the subset and corners is greater than a highest value. The comparison of the difference between the minimum and maximum values to the predetermined difference dif5×5 in condition (1a) is performed to ensure that there is a possibility of a thin line within the window. For example, if the difference between the maxOf5×5 and minOf5×5 is a smaller value (i.e., the minimum and maximum values of the subset of pixels are close to each other) that is not greater than the predetermined difference dif5×5, it is determined that a thin line most likely does not exist in the thin window currently being processed. Therefore, for condition (1a), one would generally expect the difference between the minimum and maximum values to be a high value that is greater than a predetermined value. For example, a value for the background (e.g., paper) may be a high value (e.g., 255), whereas a value for one or more pixels indicating the presence of a thin line may be a lower value (e.g., 30). This high value, therefore, would be greater than the predetermined difference dif5×5.

The highest value high7×7 is used to identify the background, i.e., white, pixels in the subset of pixels. Condition (2a) verifies that the pixels being processed are provided on a background of white, or a value close to white. Condition (2a) determines a new maximum for evaluating the subset of pixels. Specifically, a maximum ("new maximum") of the maximum value of the subset of pixels 704 (i.e., maxOf5×5) and the maximum value of corner pixels 706 (i.e., maxOf4Corners) is determined. The new maximum is then compared to the highest value high7×7. It is generally expected that the highest value high7×7 will be approximately as high as the paper white value, and may be any value that represents the highest value of white (in the window). Thus, in order to ensure that the pixels are provided on a background of white, the new maximum must be higher that the highest value high7×7. The highest value high7×7 is chosen based on a threshold value where one might expect paper to register in value (e.g., 0 to 255). For example, if paper registers at a value of 253, 254, or 255, highest value high7×7 may be set at a threshold of 252, so that when compared to the new maximum, one is ensured that the possible thin line is on a white background.

In some cases, the highest value high7×7 may be the same value as the maximum value maxOf5×5. The highest value high7×7 may alternatively be the same value as the maximum of the four corners maxOf4Corners. Thus, the maximum value maxOf5×5 and/or maxOf4Corners and highest value high7×7 are equal. In an embodiment as noted above, condition (2a) is not met, and the pixel of interest is not determined to be a part of the thin line (and so, a new pixel of interest may be chosen). However, it is envisioned in possible embodiments that condition (2a) may be defined as max(maxOf5×5, maxOf4Corners)>=high7×7. In this case, an equal condition (i.e., max(maxOf5×5, maxOf4Corners)=high7×7) would satisfy condition (2a) and thus further algorithm processing would be performed. Though a more satisfactory value for high7×7 would most likely be greater than maxOf4Corners by at least one gray level value, either determination may be used. More specifically, in some cases, threshold value(s) may be set accordingly to achieve the effect of maxOf5×5 being greater than threshold(s).

The difference dif5×5 and highest value high7×7 may be chosen based on what one would normally expect in a window having a thin line and background paper values. That is, the steps used in the method, or that are implemented by the system, may be a "smart" method or system, defined by its capability to use rules and logic to determine if the pixels/values are associated with a line or a background, and/or the like. In an example embodiment, the predetermined difference dif5×5 and the highest value high7×7 are each values that are pre-programmed and/or chosen based on experience (e.g., such as historical data). For example, one may anticipate ranges or values that are associated with darker/black pixels, as well as ranges or values that are associated with lighter/white pixels. Alternatively, in an embodiment, it is envisioned that the method (or system) may adapt to the image data that is received as input image data to determine the ranges or values that are associated with determining that the conditions are met. Any of these associations or anticipations may be used to assist in choosing the variables dif5×5 and high7×7. However, the methods or strategies for choosing such values for comparison in conditions (1a) and/or (2a) should not be limiting.

If conditions (1a) and (2a) are both met, the processing of the image data continues as described with reference to FIG. 1a. However, if conditions (1a) and (2a) are not met, processing of the image data does not continue. Rather, a new window is established (i.e., the window is traversed or moved across or down the image data), and the subset, minimum and maximum values, and conditions are evaluated for the new window with a new pixel of interest and its neighboring pixels. Each window is processed by determining these values and that these conditions (1a) and (2a) are met. By determining the minimum and maximum values based on a subset of pixels in each window, the present disclosure is capable of using variable or adaptive values when processing the image data. More specifically, when conditions (1a) and (2a) are satisfied, the minimum and maximum values of a window may be used to generate adaptive thresholds for further processing of the image data.

After step 606 and satisfying the conditions (1a) and (2a) associated therewith method 600, the processor is then used in step 608 to determine a first set of thresholds for processing the pixel of interest and neighboring pixels in the window. The first set of thresholds comprises plurality of thresholds and is determined based on the minimum and maximum values of the window. For example, the processor uses the following formula:

$$\text{unit}=(\text{maxOf5}\times 5-\text{minOf5}\times 5)>>4$$

Where:
unit is defined as an approximate range of pixel values in the window (based in the maximum and minimum values of the subset)

This formula is used to divide the difference of the maximum value maxOf5×5 and the minimum value minOf5×5 into a plurality of sections (e.g., 16), using a known mathematical method. Specifically, a unit comprises a number of ranges (as a result of dividing the difference between maxOf5×5 and minOf5×5) of pixel values. The unit is used to calculate the first set of thresholds. Because the unit is determined based on the minimum and maximum values, which are variable with respect to the values of the pixels in the window, the first set of thresholds also comprises multiple variable or adaptive thresholds. That is, the first set of thresholds for processing the pixel of interest and its neighboring pixels is variable as the window is moved along the image data.

In an example embodiment, the unit is used in step 608 to determine three threshold values for thresholding the window of pixels (such as described below in step 610). For example, the first set of determined thresholds may include multiple thresholds such as a low threshold value, a mid threshold value, and a high threshold value. The first set may comprise a plurality of thresholds so that a range of values may be considered for determining that a thin line is present in the window of image data.

In an embodiment, the following formulas are used to calculate the first set of thresholds:

$$\text{threshLow}=((\text{maxOf5}\times 5+\text{minOf5}\times 5)>>1)+\text{factorLow}*\text{unit}$$

$$\text{threshMid}=((\text{maxOf5}\times 5+\text{minOf5}\times 5)>>1)+\text{factorMid}*\text{unit}$$

$$\text{threshHigh}=((\text{maxOf5}\times 5+\text{minOf5}\times 5)>>1)+\text{factorHigh}*\text{unit}$$

Where:
factorLow is a low value that is used for determining a low threshold value factorMid is a middle or average value that is used for determining a middle threshold value factorHigh is a high value that is used for determining a high threshold value threshLow is a low threshold value that is used for processing the values of the pixels in the window threshMid is a middle or average threshold value that is used for processing the values of the pixels in the window threshHigh is a high threshold value that is used for processing the values of the pixels in the window Each of these formulas mathematically depicts that an average of the maximum value and minimum value of the selected subset of the window (i.e., the summation of maxOf5×5 and minOf5×5 is divided by two). A value is then added to this average to determine each of the thresholds in the first set. The value that is added is based on the previously calculated unit and the low, middle, and high factor values.

The low, middle, and high factor values used to determine the thresholds may each comprise values that are pre-programmed and/or chosen based on experience (e.g., such as historical data). As noted above, such values are variable. For example, the factor values may be chosen such that the multiple thresholds threshLow, threshMid, and threshHigh are based on an average or mean value of the subset of pixels, or based on a variation thereof.

For purposes of explanation only, one may consider the following: if a low or minimum value of the pixels is 50, and the high or maximum value of the pixels is 150, the average of these values is 100. The factor values may be manipulated or set such that the three (3) threshold values for processing the image data are: 75 (threshLow), 100 (threshMid), and 125 (threshHigh). This example illustrates that the multiple thresholds in this disclosure are used to increase flexibility for determining the presence of a thin line. This flexibility allows for not only better detection of thin lines, but also reduces or prevents false detection of lines (e.g., such as may be associated with processing halftone image data). Advantages such as these are further described below. Of course, any number of thresholds (e.g., 2, 3, 4, or more) may be used to determine the first set of thresholds and is not limited to those discussed herein.

The pixel of interest and neighboring pixels of the window are then thresholded in step 610 of method 600 by the processing module using the first set of thresholds (e.g., threshLow, threshMid, and threshHigh). For example, in an embodiment, for each of the regions in the window, one or more of the thresholds may be applied to determine if a pixel value is greater than, equal to, or less than a determined threshold. Pixels that exceed or are greater than a threshold are defined as "on" pixels. Pixels that are less than a threshold are defined as "off" pixels. In some instances, if a pixel meets a threshold, it may be an "on" or "off" pixel. After applying the thresholds, step 612 then counts the number of "on" pixels in each of the predetermined regions of the window (for each threshold that is applied to that region).

In a sense, binary concepts are used to analyze the image data. For example, in a binary image, a pixel is either "on" or "off" (i.e., has a value of 1 for black, or 0 for white). In this case, the first set of thresholds is used to determine if a pixel in the window is "on" or "off," so that the "on" pixels may be counted. However, it should be noted that conversion of the image data contone to binary is not necessary. Rather, the concept of determining if a pixel is included or not included (i.e., yes or no) for further processing is applied during thresholding in step 610.

Additionally, it should be noted that the determination of "on" and "off" pixels in step 610 and the subsequent counting of step 612 is performed each time a threshold is applied to a region of the window. For example, if a first region of the window is thresholded using threshHigh and threshMid, two counts—one associated with the number of "on" pixels after applying the high threshold, and one associated with the number of "on" pixels after applying the middle threshold—are determined. Each region is evaluated to determine the pixels that may be associated with a specific location and orientation of a thin line (assuming the thin line exists).

In some cases, one of the thresholds may be applied to each region of the window. In some cases, two or more thresholds are applied to a region of the window. In an embodiment, each of the thresholds of the first set (e.g., threshLow, threshMid, threshHigh) may be associated with a specific region in the window.

For example, depending on an orientation or directionality of a line, one may consider that each of the regions of the window may exhibit specific pixel value characteristics (e.g., higher or lower values). As such, one may apply a threshold from the first set of thresholds to any number of the regions (e.g., one or more) in the window, or may limit applying the threshold to one or more regions. In an embodiment, as described below, by considering the possibility of directionality, the amount of processing time required to determine if a thin line exists in the window may be decreased. Of course, it should be noted that the directionality of the line need not be considered, and is not essential for implementation.

After counting the number of pixels in step 612, the counts are used to determine if a line is found in the window using method 600. Specifically, each counted number of pixels (for each associated region) is thresholded using a second set of thresholds in step 614. In an embodiment, the counted number of pixels may be compared to the second set of thresholds to determine if the two values are at least equal. The second set of thresholds may be pre-programmed and/or chosen based on experience (e.g., such as historical data). For example, one may anticipate ranges or values that are associated with pixels that represent a line. Alternatively, in an embodiment, it is envisioned that the method (or system) 600 may adapt to the image data that is received. Any of these associations or anticipations may be used to assist in choosing the second set of thresholds and should not be limiting Nonetheless, if it is determined that the counts meet or exceed the second set of thresholds, it may be determined that a thin line exists in the window in step 616 using method 600. Thereafter, step 618 classifies the pixel of interest. Specifically, if it is determined that the thin line exists in step 616, and that the pixel of interest in the window is part of the thin line, the pixel of interest is classified as an edge pixel. Alternatively, the pixel of interest may be classified as a non-edge pixel if it is determined that a thin line does not exist in step 616, or if it is determined that the pixel of interest is not a part of the thin line. For example, it may be determined that a thin line does not exist in the window if the counted number of pixels does not meet the second set of thresholds. It may also be determined that the pixel of interest (i.e., center pixel) is not a part of the thin line (e.g., the thin line appears in a different region of the window).

After classifying the pixel of interest in step 618, the processing of the image data may begin again by establishing a new window in step 602.

In some embodiments, the pixel of interest may be classified by a tag. Generally; the application of a tag to a pixel is known in the art. In this case, the tag may be used to aid in developing an edge map of the image data—i.e., map illustrating the pixels that are included in thin lines or edges throughout the image. A tag may indicate that a pixel is an edge pixel or a non-edge pixel. Tags may also only be used to indicate that the pixel is an edge pixel. However, such tagging of the image data need not be provided, and their indications need not be limiting.

Figure 6B:
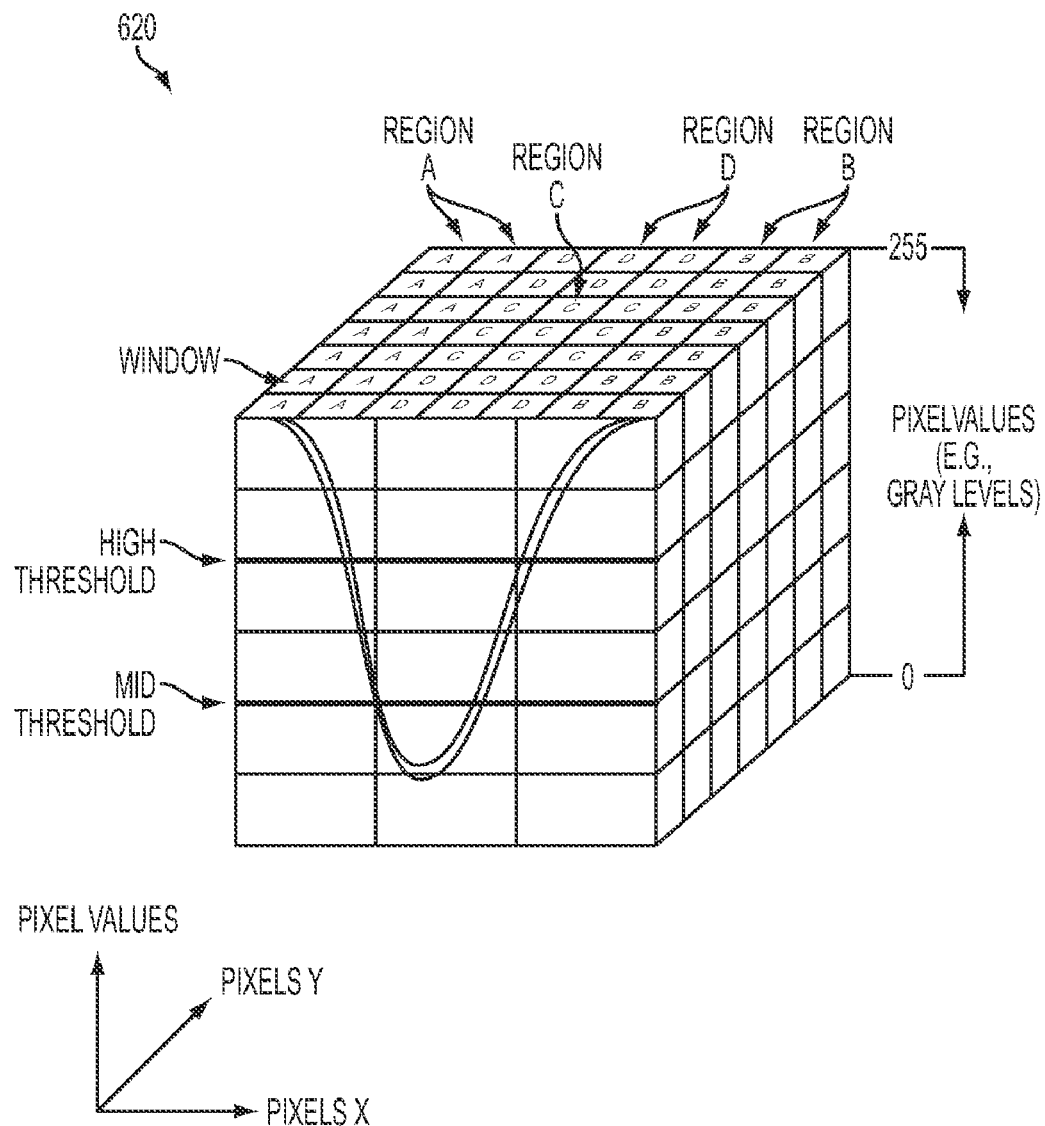

FIG. 6*b* illustrates a graphical representation of the method of FIG. 6*a*. Specifically, the graph 620 illustrates the relationship of the window, its regions, the first set of thresholds and the pixel values for determining the presence of a thin line in a window. The front face is a representation of what a cross section of a continuous tone 'vertical' thin line would like (as a reference). The diagram illustrates an embodiment showing how the particular threshold values and the design of the regions A, B, C, and D can be selected in a way that would identify a vertical thin line. That is, a vertical thin line would be suspected, for example, if there were a high number of pixels in Region A and Region B above the high threshold line, and high number of Region C and Region D pixels below the mid threshold line. As will become further evident, such regions may be edited/altered based on the type or orientation of the line being detected.

Though the directionality or orientation of the line need not be considered, FIGS. 8-11 illustrate examples of regions (each region labeled with one of the letters A-M) that may be used for processing the image data. More specifically, FIGS. 8-11 correspond to a window having a possible line orientation—vertical, horizontal, backward diagonal, and forward diagonally, respectively—and the regions associated therewith for processing and thresholding the pixels of image data. When the processing is being performed by the processor, the thresholds that are associated with the determination of each line orientation in the window may be applied in parallel manner, so that the operations are performed simultaneously.

The descriptions of FIGS. 8-11 illustrate a plurality of regions associated with the window with regard to line orientation, as well as describe example formulas that may be used to threshold the pixel of interest and its neighboring pixels (i.e., (using a first set of thresholds)) and to count a number of pixels in a region after thresholding, as described in steps 610 and 612 of method 600. Each of the windows 800-1100 of FIGS. 8-11 depict the regions that are analyzed and are related to a possible line orientation. As such, in an embodiment, the regions of the window may be determined based on the probable location and directionality of the line.

For example, a window 700 may comprise a plurality of regions X, Y, Z, and a center region. Each of the regions X, Y, Z, and the center may be thresholded using one or more of thresholds in the first set, and the pixels counted thereafter. The thresholding and counting of pixels may be repeated by processing the regions of data until it is determined if a line exists.

In an example embodiment, the processor uses the following equations to calculate the pixel counts in a window 700:

highXCount=number of pixels that are>=threshHigh in "X" region midXCount=number of pixels that are>=threshMid in "X" region highYCount=number of pixels that are>=threshHigh in "Y" region inidYCount=number of pixels that are>=threshMid in "Y" region midZCount=number of pixels that are <threshMid in "Z" region lowZCount=number of pixels that are <threshLow in "Z" region Where:

highXCount is a total count of the number of pixels that are greater than or equal to a first threshold (e.g., in the first set of thresholds, threshHigh) in an "X" region, the "X" region being a first region in the window midXCount is a total count of the number of pixels that are greater than or equal to a second threshold (e.g., in the first set of thresholds, threshMid) in the "X" region highYCount is a total count of the number of pixels that are greater than or equal to the first threshold (e.g., threshHigh) in a "Y" region, the "Y" region being a second region in the window midYCount is a total count of the number of pixels that are greater than or equal to the second threshold (e.g., threshMid) in the "Y" region midZCount is a total count of the number of pixels that are less than the second threshold (e.g., threshMid) in a "Z" region, the "Z" region being a third region in the window lowZCount is a total count of the number of pixels that are less than a third threshold in the first set of thresholds (e.g., threshLow) in the "Z" region These counts are then further thresholded, as described in step 614 of method 600, to determine if a thin line exists.

Figure 8:
FIGS. 8-11 illustrate a plurality of regions of the window of FIG. 2 for analyzing and processing pixels.

FIG. 8 illustrates a window 800 which is an example embodiment showing the designation of regions that may be processed for the 7×7 window 700 of FIG. 7. Specifically, the window 800 illustrates one example of the regions that may be analyzed to determine the presence of a vertical line. The regions are labeled, for clarity purposes only, using letters; specifically, window 800 is divided into regions A, B, C, and D. Each of the regions A, B, and D represent the plurality of regions of the window that may be analyzed in steps 610 and 612. Region A comprises the two left vertical columns of the window. Region B comprises the two right vertical columns of the window. Region D comprises the middle columns of the window, excluding the center region C. In this case, region D comprises a plurality of sections (e.g., upper and lower middle regions); however, as noted above, the number of regions for processing should not be limiting. Thus, in some embodiments, the upper middle section and lower middle section may be considered different regions. In any case, this window 800 depicts an example of the regions that may be analyzed to determine a vertical line.

Figure 9:
Figure 10:
Figure 11:

In an example embodiment, the processor uses the following equations to calculate the pixel counts, the regions depicted in FIG. 8 being associated with the possible determination of a vertical line:

highACount=number of pixels that are>=threshHigh in "A" region midACount=number of pixels that are>=threshMid in "A" region highBCount=number of pixels that are>=threshHigh in "B" region midBCount=number of pixels that are>=threshMid in "B" region midDCount=number of pixels that are <threshMid in "D" region lowDCount=number of pixels that are <threshLow in "D" region Region C represents the center region of the window 800. As shown in FIGS. 9-11 as well, the location and size (e.g., number of pixels) of region C is common in all of the thresholding processes. Because the center region C is common to all of the possible orientations of a line, the center is processed and verified separately.

FIG. 9 illustrates a window 900 which is an example embodiment showing the designation of alternate regions E, F, G, and center region C of the window 700 that may be processed. Each of the regions E, F, G, C may be designated such that thresholding and counting may determine the presence of a line of horizontal orientation. In this embodiment, region E comprises the two top horizontal rows of the window. Region F comprises the two bottom rows of the window. Region G comprises the middle horizontal rows of the window, excluding the center region C.

In an example embodiment; the processor uses the following equations to calculate the pixel counts, the regions depicted in FIG. 9 being associated with the possible determination of a horizontal line:

highECount=number of pixels that are>=threshHigh in "E" region midECount=number of pixels that are>=threshMid in "E" region highFCount=number of pixels that are>=threshHigh in "F" region midFCount=number of pixels that are>=threshMid in "F" region midGCount=number of pixels that are <threshMid in "G" region lowGCount=number of pixels that are <threshLow in "G" region FIG. 10 illustrates a window 1000 which is an example embodiment showing the designation of alternate regions H, I, J, and center region C of the window 700 that may be processed. Each of the regions H, I, J, C may be designated such that thresholding and counting may determine the presence of a line of backward diagonal ("\") orientation. In this embodiment, region H comprises a plurality of pixels in a lower left hand corner of the window. Region I comprises a plurality of pixels in an upper right hand corner of the window. Region J comprises the middle diagonal pixels of the window, in the upper left and lower right corners, excluding the center region C.

In an example embodiment, the processor uses the following equations to calculate the pixel counts, the regions depicted in FIG. 10 being associated with the possible determination of a backward diagonal line:

highHCount=number of pixels that are>=threshHigh in "H" region midHCount=number of pixels that are>=threshMid in "H" region highICount=number of pixels that are>=threshHigh in "I" region midICount=number of pixels that are>=threshMid in "I" region midJCount=number of pixels that are <threshMid in "J" region lowJCount=number of pixels that are <threshLow in "J" region FIG. 11 illustrates a window 1100 which is an example embodiment showing the designation of alternate regions K, L, M, and center region C of the window 700 that may be processed. Each of the regions K, L, M, C may be designated such that thresholding and counting may determine the presence of a line of forward diagonal ("/") orientation. In this embodiment, region K comprises a plurality of pixels in an upper left hand corner of the window. Region L comprises a plurality of pixels in a lower right hand corner of the window. Region M comprises the middle diagonal pixels of the window, in the lower left and upper right corners, excluding the center region C.

In an example embodiment, the processor uses the following equations to calculate the pixel counts, the regions depicted in FIG. 11 being associated with the possible determination of a forward diagonal line:

highKCount=number of pixels that are>=threshHigh in "K" region midKCount=number of pixels that are>=threshMid in "K" region highLCount=number of pixels that are>=threshHigh in "L" region midLCount=number of pixels that are>=threshMid in "L" region midMCount=number of pixels that are <threshMid in "M" region lowMCount=number of pixels that are <threshLow in "M" region Again, each of these steps may be processed by the processor simultaneously. As noted above, the pixels in the center region C are common to any or all of the possible line orientations in the window (see FIGS. 8-11). That is because, regardless of the orientation of a thin line, the center pixels C are generally the same, and therefore are counted only once. In this example embodiment, the center pixels comprise a 3×3 matrix of pixels located in the center of the window (i.e., nine (9) pixels). However, the number of center pixels may depend on how thin the line is that is being searched for. Thus, the number of center pixels C and size of the matrix used in the center pixel calculation may be altered or adjusted in some embodiments.

The center region C may be processed before, after, or concurrently with the multi-thresholding process of the regions in the window. That is, the center pixels C are thresholded using at least one of the thresholds in the first set of thresholds, and a total count of the number of pixels is determined. In some cases, the center region C may be thresholded using all of the thresholds in the first set. As an example, the following determinations are made using the processor:

midCCount=number of pixels that are <threshMid in "C" region lowCCount=number of pixels that are <threshLow in "C" region highCCount=number of pixels that are>threshHigh in "C" region FIGS. 8-11 illustrate that one may designate the regions for processing based on expectations. For example, in the case of vertical line detection, such as shown in FIG. 8, one would expect a higher number of counted pixels in regions A and B, and a lower number of counted pixels in regions C and D, if a representative vertical line running down the middle of the window is present. That is, a higher count of pixels in regions A and B indicate a plurality of background or white pixels, while a lower number of counts pixels in regions C and D may indicate the presence of darker or black pixels. Thus, the regions may be designated accordingly. FIGS. 8-11 illustrate examples of such regions. In some cases, the regions may assist in determining the presence of thin lines of alternate orientation. For example, the vertical line detection regions of FIG. 8 may assist in detecting lines that are not exactly vertical, but, perhaps, at a slight angle (e.g., 5 degrees from center). As such, the region designation, including the size of the matrix for the center region C, should not be limiting. In some cases, the regions may be adaptive based on the size of the window 700.

Nonetheless, the counts determined by thresholding the designated regions are further processed to calculate or detect the presence of the thin line. More specifically, the processor thresholds the counted number of pixels using the second set of thresholds, as noted by step 614. The second set of thresholds is used to determine that a thin line exists in the window. As noted above, the second set of thresholds may be pre-programmed and/or chosen based on experience (e.g., such as historical data). For example, for each possible line orientation, one may anticipate ranges or values that are associated with pixels that represent the line. In an embodiment, the second set of thresholds is compared/thresholded using the total counts associated with a specific line orientation. All of the thresholds of the second set must be met in order to determine the possibility of the presence of a thin line.

In an embodiment, the counted number of pixels may be thresholded, using the following second set of thresholds, to determine following condition is satisfied:

(3a) If any one or more of these conditions are met, a thin line exists in at least one of the regions of the window:

Condition Set A
  highACount>=sideHighThresh
  midACount>=sideMidThresh
  highBCount>=sideHighThresh
  midBCount>=sideMidThresh
  midDCount+midCCount>=middleMidThresh
  lowDCount+lowCCount>=middleLowThresh
  midDCount>=twoEndVHMidThresh
  lowDCount>2 twoEndVHLowThresh Condition Set B
  highECount>=sideHighThresh
  midECount>=sideMidThresh
  highFCount>=sideHighThresh
  midFCount>=sideMidThresh
  midGCount+midCCount>=middleMidThresh
  lowGCount+lowCCount>=middleLowThresh
  midGCount>=twoEndVHMidThresh
  lowGCount>=twoEndVHLowThresh Condition Set C
  highHCount>=cornerHighThresh
  midHCount>=cornerMidThresh
  highICount>=cornerHighThresh
  midICount>=cornerMidThresh
  midJCount+midCCount>=diagonalMidThresh
  lowJCount+lowCCount>=diagonalLowThresh
  midJCount>=twoEndDiaMidThresh
  lowJCount>=twoEndDiaLowThresh Condition Set D
  highKCount>=cornerHighThresh
  midKCount>=cornerMidThresh
  highLCount>=cornerHighThresh
  midLCount>=cornerMidThresh
  midMCount+midCCount>=diagonalMidThresh
  lowMCount+lowCCount>=diagonalLowThresh
  midMCount>=twoEndDiaMidThresh
  lowMCount>=twoEndDiaLowThresh Where:
Where:
  sideMidThresh is a mid threshold value for a side region of the window
  sideHighThresh is a high threshold value for a side region of the window
  middleMidThresh is a mid threshold value for a middle region of the window
  middleLowThresh is a low threshold value for a middle region of the window
  diagonalMidThresh is a mid threshold value for a diagonal region of the window
  diagonalLowThresh is a low threshold value for a diagonal region of the window
  twoEndVHMidThresh is a mid threshold value for the sections of the middle region which are not located in the center of the region
  twoEndVHLowThresh is a low threshold value for the sections of the middle region which are not located in the center of the region
  twoEndDiaMidThresh is a mid threshold value for the sections of the diagonal region which are not located in the center of the region
  twoEndDiaLowThresh is a low threshold value for the sections of the diagonal region which are not located in the center of the region
  Condition Set A is associated with the presence of a vertical line
  Condition Set B is associated with the presence of a horizontal line
  Condition Set C is associated with the presence of a backward diagonal line
  Condition Set D is associated with the presence of a forward diagonal line Condition (3a) determines that a line is found in one or more of the regions in the window. For explanatory purposes only, condition (3a) is broken down into four (4) sets. Each of the sets represents the criteria that must be met using the second set of thresholds for a corresponding line. If all of the thresholds are met in a condition set, it is determined that a line in the noted direction is possibly found.

It also should be noted that the second set of thresholds (e.g., sideMidThresh, sideHighThresh, middleMidThresh, middleLowThresh, diagonalMidThresh, diagonalLowThresh, twoEndVHMidThresh, twoEndVHLowThresh, twoEndDiaMidThresh, and twoEndDiaLowThresh) may be programmable and variable parameters. For example, the values of such parameters may be chosen based on experience (e.g., historical data) or based on the values that are present in the window. In some cases, however, the second set of thresholds may be adaptable or variable based on the number of pixels, window size, etc.

When the processor thresholds the counted number of pixels in step 614 of method 600, the condition sets of condition (3a) may be processed simultaneously. However, condition (3a) does not necessarily specify what type of line is found, or that a line exists. Condition (3a) determines if the surrounding regions A/B/D, E/F/G, H/I/J, and/or K/L/M satisfy the conditions/thresholds for indicating the presence of a line. Again, because the center region C is common to all of the possible orientations of a line, the total count of pixels for the center is thresholded separately. It is assumed that a thin line will most likely hit at least one of the center pixels. Therefore, to determine if a line exists in the window 700, such as noted in step 616 of the method 600, both the surrounding regions and the center region of the window must by thresholded and satisfy the conditions. Step 616 also includes thresholding the counted number of pixels in the center region C using the second set of thresholds.

The center region C may be processed using the second set of thresholds before, after, or concurrently with the thresholding process of the counted number of pixels. That is, the center pixels C are thresholded using at least one of the thresholds in the second set of thresholds, and it is determined if the condition is satisfied. In some cases, the center region C may be thresholded using all of the thresholds in the first set. As an example, the following condition is thresholded using the processor:

midCCount>=centerMidThresh lowCCount>=centerLowThresh highCCount<centerHighThresh (4a)

Condition (4a) determines if center region is part of the possible thin line. If all of the thresholds are met, then condition (4a) is true. Thus, it is identified that a thin line does exist in step 616. If one or none of the thresholds are satisfied in condition (4), then a thin line does not exist.

Thereafter, the pixel of interest (i.e., the center pixel) is classified, such as noted in step 618 of the method 600. Upon determination of the existence, orientation, and location of a line, the pixel of interest may be classified as an edge pixel. That is, the pixel of interest (i.e., center pixel) is classified as an edge pixel that is part of the thin line if it is determined that the thin line exists (condition (3a)), and that the pixel of interest is part of the thin line (condition (4a)). If one or none of conditions (3a) or (4a) are met, the pixel of interest is classified as a non-edge pixel.

In some embodiments, the pixel may be tagged based on its determination and the processing and windowing of the image data continues until the second thin line detection method determines a second result for the presence of thin lines in the image data. In some embodiments, such as in hardware implementations, the detection of thin lines using the described methods can happen virtually at the same time. In any case, thereafter, the results are combined to produce a thin line determination as noted above in step 112 of method 100, which may then be merged with other image segmentation results as noted in step 114 to produce an image to be output.

FIG. 2 illustrates an example system 200, in accordance with an embodiment, that may be used to implement the proposed method and/or algorithm of FIG. 1. It is to be understood that the image segmentation system 200 and method 100 as described herein may be implemented or processed using a number of devices, including a processor, computer, microprocessor, microcontroller, circuit elements, logic circuits or devices, as well as combinations of software and hardware, and should not be limited to those described herein. The system 200 may be, for example, a system for scanning, printing, faxing, copying, etc. or a system for combining such multiple functions, and should not be limiting.

As shown, the system 200 generally comprises an input device 202, a processing device or module 204, and an output device 206. System 200 may be an apparatus or device and/or can be a xerographic system, a photocopier, or printing device. The input device 202 may comprise an image input terminal (IIT) that is used to acquire or receive image data. For example, in some embodiments, the input device 202 may comprise a digital scanner or some other device for capturing image data. For example, image data may be capturing by a scanner in a copier, facsimile machine, a multi-function device (MFD), a camera, a video camera, or any other know or later device that is capable of scanning and/or capturing electronic image data. It should also be understood to one of ordinary skill in the art that image data may be received as input via Internet Protocol (IP), server, electronic communication (e.g., e-mail) or some other method or device, and/or that input device may be connected to a network, and that methods for receiving such data should not be limiting.

After input data or image data is received via an input device 202, the data is processed using the processing module 204. The processing module 204 may comprise a plurality of modules for processing the data for storage and/or output, for example. Though a plurality of modules for processing the data are shown and described, it should be noted that the types of modules and processes performed thereon should not be limited to those provided. For example, more or less devices may be used to perform the processing functions. The processing operations may be carried out by hardware (e.g., FPGA or ASIC) or software components. For example, it should be noted that the system 400 may comprise one or more processors, and should not be limited. The one or more processors such as processing module 204 is capable of executing machine executable program instructions. In an embodiment, the processor is in communication with a bus (not shown). The system 200 may also include memory (not shown) that is used to store machine readable instructions to be executed by the processing module 204. The memory is capable of storing data used by or produced by the processing module 204. The type of memory should not be limiting; for example, the memory may alternatively include random access memory (RAM).

In the embodiment of FIG. 2, the image data sent from the input device 202 to a preparation module 208 of the processing module 204. Preparation module 208 may include performing functions on the input data such as noise reduction and pixel level mapping, for example. The data may then be processed by a context buffering module 210. Preparation module 208 and context buffering module 210 may work in combination with an image segmentation module 212 as well. The image segmentation module 212 is used to process the image data using image segmentation techniques, such determining MRC or classifying pixels of the input image data into classes such as continuous tone (contone) of different levels or smoothness, halftones of different frequency, edge, background, etc., and may provide the classified data with micro-segmentation tags, as represented by element 228. Such a module may be an existing module or a module for performing such processes as is known in the art. Some image segmentation modules also compute and export features such as edge strength, as represented by element 224. In some cases, the image segmentation module 212 may include one or image segmentation modules for performing existing processes or techniques on the image data (e.g., such as determining a background layer, selector layer, and a foreground layer using MRC techniques, other performing other segmentation techniques as previously noted). Of course, it should be noted that image segmentation module 212 need not be used, nor present in the system 200. However, by using the image segmentation module 212 to apply segmentations methods to image data as well as the first and second thin line detection methods, the merged combination of results will produce a better quality output image.

In this case as shown FIG. 2, the image segmentation module 212 is used in combination with a run-length thin line detection module 214*a* (i.e., a first thin line detection module) and multi-threshold thin line detection module 214*b* (i.e., a second thin line detection module) to offer much improved results over existing segmentation modules. In some cases, the image data is processed concurrently by an image segmentation module 212, a run-length thin line detection module 214*a* and a multi-threshold thin line detection module 214*b*. The run-length thin line detection module 214*a* and the multi-threshold thin line detection module 214*b* may perform the first and second thin line detection methods as described with reference to FIGS. 3 and 6, respectively (and as disclosed in the incorporated Applications), to determine thin lines in the image data. For example, the each thin line detection module 214*a* and 214*b* is provided to establish a window and use their respective steps to detect the if a thin line exists in the input data, so that such results can be combined as noted in step 112 of method 100.

In some embodiments, additional or separate modules for performing the steps of the method may be provided in conjunction with or as a part of the thin line detection module. For example, in some cases, a min-max module, threshold module, and/or classification module, represented by element 226, may be a part of the thin line detection module 214. In other cases, the thin line detection modules 214*a* and 214*b* may be combined into a single module 214 for processing the image data using the first and second methods and determining the first and second results. As such, the modules shown should not be limiting.

The results or output from each of the thin line detection modules 214a and 214b may be optionally dilated by one or more dilation modules 216, as is generally known in the art. That is, a dilation module 216 may perform an efficient one-dimensional (1-D) dilation routine that is added to grow an edge map (e.g., in a fast scan process) which may improve the performance of image data enhancement routines. In some embodiments, if memory constraints are not limited, dilation can be performed in a slowscan direction, as well via a dilation kernel of any size.

Thereafter, the thin line detection results from the modules 214a and 214b are combined by a combination module 218 to produce a thin line determination in the image data. The combination module 218 may be a separate module or a part of the processor 204, for example. Generally, the combination module 218 is a module that is used to combine the results for thin line detection in the image data. The combined image data or thin line determination from the combination module 218 can then be re-mapped using a re-mapping module 220. In some cases, the re-mapping may be based on an edge strength 224 that is reported by the image segmentation module 212. For example, the combination can be a simple 2-bit in/1-bit out look-up table. Alternatively, the edge strength 224 determined by the image segmentation module 212 may be used to control the dilation of the image data by the dilation module 216 and a combination of the thin line detection results. The thin line detection results may then be merged with the segmentation tag stream (i.e., the image data processed using image segmentation techniques of module 212) using a merging module 222. In some cases, a simple look-up table, as known in the art, may be used to provide flexibility in merging the documents. The processed image data may then be output to an output device 206 such as a printer. The word "printer" encompasses any apparatus, such as a digital copier, bookmaking machine, facsimile machine, multi-function machine, etc. which performs a print outputting function for any purpose.

Other embodiments include incorporating the above steps into a computer program product or non-transitory computer readable medium comprising instructions that, when read and executed by a computer, cause the computer to perform a method 100 in an automated fashion. The instructions may be stored on a data carrier or otherwise a computer readable medium. For example, the method of FIG. 1 may be a chart of such computer readable instructions. For example, in some embodiments, memory or storage of a system 200 carrying computer readable instructions is configured such that when the computer readable instructions are executed by a computer or processing module 204, they cause a computer to automatically perform a method for detecting thin lines in image data.

According to an embodiment of the disclosure, the processing of image data is provided by system 200 in response to processing module 204 executing one or more sequences of one or more instructions contained in a memory (not shown). Such instructions may be read into the memory from another computer-readable medium, such as a storage device (which may or may not be a part of the memory). Execution of the sequences of instructions contained in the memory causes processing module 204 to perform the process steps of method 100 described herein. One or more processors in a multi-processing arrangement may also be employed to execute the sequences of instructions contained in the memory of the system 200. However, the embodiments of this disclosure are not limited to any specific combination of hardware and/or software.

The term "computer program product" as used herein refers to any product or medium that participates in providing instructions to processing module 204 for execution. Such a product may take many forms, including but not limited to, non-volatile media, volatile media, and transmission media. Common forms of computer program products or readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other product from which a computer can read. Also, various forms of computer products or media may be involved in carrying one or more sequences of one or more instructions to processing module 404 for execution, and should not be limiting.

While the principles of the disclosure have been made clear in the illustrative embodiments set forth above, it will be apparent to those skilled in the art that various modifications may be made to the structure, arrangement, proportion, elements, materials, and components used in the practice of this disclosure. For example, it is to be understood that in some embodiments, the run-length thin line detection module 214a and/or the multi-threshold thin line detection module 214b may be modules (or combined into one module) that are added to supplement an existing processing system or processor 204. Also, the claims can encompass embodiments in hardware, software, or a combination thereof.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for processing image data, the method comprising:
receiving contone image data via an input device, the image data comprising a plurality of pixels;
using a processor to process the image data and determine a presence of thin lines, wherein each determined thin line comprises at most four pixels along its width, the processing including:
(a) processing the image data using a first thin line detection method to determine a first result for the presence of thin lines, the processing comprising:
establishing a window comprising a pixel of interest and neighboring pixels;
determining a minimum value and a maximum value in a selected subset of pixels in the window;
thresholding the pixel of interest and neighboring pixels of the window using thresholds;
converting the pixels in the window, after thresholding, into a binary window of image data comprising a plurality of binary pixels, the binary pixels including a number of on and off pixels;
determining characteristics associated with the on pixels in each row and column of the binary window;
thresholding the characteristics associated with the on pixels and off pixels of the binary window;

determining if a thin line exists in the window based on the thresholding of the characteristics associated with the on pixels and off pixels; and classifying the pixel of interest as an edge pixel that is part of a thin line if it is determined that the thin line exists;

(b) processing the image data using a second thin line detection method to determine a second result for the presence of thin lines, the processing comprising:

establishing a window comprising a pixel of interest and neighboring pixels, the window comprising a plurality of predetermined regions;

determining a minimum value and a maximum value of a selected subset of pixels in the window;

thresholding the pixel of interest and neighboring pixels of the window using a first set of thresholds;

counting a number of pixels in each of the predetermined regions of the window after applying the first set of thresholds;

thresholding the counted number of pixels using a second set of thresholds;

determining if a thin line exists in the window based on the thresholding of the counted number of pixels; and classifying the pixel of interest as an edge pixel that is part of a thin line if it is determined that the thin line exists and that the pixel of interest is part of the thin line; and combining the first result and the second result of the processed image data from the first thin line detection method and the second thin line detection method to produce a thin line determination in the image data.

2. The method according to claim 1, further comprising:
processing the image data using image segmentation techniques, and
merging the thin line determination with the image data processed using image segmentation techniques.

3. The method according to claim 2, wherein the image segmentation techniques include determining data representing a background layer, a selector layer, and a foreground layer of the image data.

4. The method according to claim 2, further comprising:
outputting the image data via an output device.

5. The method according to claim 1, wherein the method further includes:
tagging the pixel of interest as an edge pixel in the first thin line detection method and/or the second thin line detection method if it is determined that a thin line exists.

6. The method according to claim 1, wherein the method further includes:
tagging the pixel of interest as a non-edge pixel in the first thin line detection method, or tagging the pixel of interest as a non-edge pixel in the second thin line detection method, or both, if it is determined that either a thin line does not exist or that the pixel of interest is not a part of the thin line.

7. The method according to claim 1, wherein the method further includes, upon determining that a thin line exists and producing the thin line determination, determining the orientation of the thin line within the window.

8. The method according to claim 7, wherein the orientation of the line is selected from the group consisting of: vertical, horizontal, forward diagonal, or backward diagonal.

9. The method according to claim 1, wherein the processing includes: determining the thresholds for processing the pixel of interest and neighboring pixels in the window for the first thin line detection method based on the minimum and maximum values, or determining the thresholds for processing the pixel of interest and neighboring pixels in the window for the second thin line detection method based on the minimum and maximum values, or both.

10. The method according to claim 1, wherein, in the first thin line detection method, the characteristics associated with the on pixels include a start location, an end location, and a length of a sequence of on pixels in a row or a column in the binary window.

11. The method according to claim 1, wherein, in the first thin line detection method, the characteristics associated with the on pixels include variations in on runs in a row or column and locations of on runs in a row or column.

12. The method according to claim 11, wherein the variations or locations indicate a broken sequence in a row or column in the binary window.

13. The method according to claim 1, wherein the thresholding the characteristics in the first thin line detection method includes: comparing characteristics associated with the on pixels in each row or each column, or both, with characteristics among all of the rows, or columns, or both, in the binary window.

14. A system for detecting thin lines in image data, the system comprising:

an input device for receiving contone image data, the image data comprising a plurality of pixels;

a processor configured to process the image data and determine the presence of thin lines each determined thin line comprising at most four pixels along its width;

the processor comprising at least one thin-line detection module comprising code executable by the processor for performing a method comprising:

(a) processing the image data using a first thin line detection method to determine a first result for the presence of thin lines, the processing comprising:

establishing a window comprising a pixel of interest and neighboring pixels;

determining a minimum value and a maximum value in a selected subset of pixels in the window;

thresholding the pixel of interest and neighboring pixels of the window using thresholds;

converting the pixels in the window, after thresholding, into a binary window of image data comprising a plurality of binary pixels, the binary pixels including a number of on and off pixels;

determining characteristics associated with the on pixels in each row and column of the binary window;

thresholding the characteristics associated with the on pixels and off pixels of the binary window;

determining if a thin line exists in the window based on the thresholding of the characteristics associated with the on pixels and off pixels; and classifying the pixel of interest as an edge pixel that is part of a thin line if it is determined that the thin line exists;

(b) processing the image data using a second thin line detection method to determine a second result for the presence of thin lines, the processing comprising:

establishing a window comprising a pixel of interest and neighboring pixels, the window comprising a plurality of predetermined regions;

determining a minimum value and a maximum value of a selected subset of pixels in the window;

thresholding the pixel of interest and neighboring pixels of the window using a first set of thresholds;

counting a number of pixels in each of the predetermined regions of the window after applying the first set of thresholds;

thresholding the counted number of pixels using a second set of thresholds;

determining if a thin line exists in the window based on the thresholding of the counted number of pixels; and classifying the pixel of interest as an edge pixel that is part of a thin line if it is determined that the thin line exists and that the pixel of interest is part of the thin line; and combining the first result and the second result of the processed image data from the first thin line detection method and the second thin line detection method to produce a thin line determination in the image data.

15. The system according to claim 14, wherein the at least one thin-line detection module comprises code executable by the processor that is configured to determine an orientation of a thin line.

16. The system according to claim 14, further comprising: an output device for outputting the image data.

17. A non-transitory computer-readable medium comprising instructions that, when executed by a computer, cause the computer to perform a method comprising:

(a) processing the image data using a first thin line detection method to determine a first result for the presence of thin lines, the processing comprising:

establishing a window comprising a pixel of interest and neighboring pixels;

determining a minimum value and a maximum value in a selected subset of pixels in the window;

thresholding the pixel of interest and neighboring pixels of the window using thresholds;

converting the pixels in the window, after thresholding, into a binary window of image data comprising a plurality of binary pixels, the binary pixels including a number of on and off pixels;

determining characteristics associated with the on pixels in each row and column of the binary, window;

thresholding the characteristics associated with the on pixels and off pixels of the binary window;

determining if a thin line exists in the window based on the thresholding of the characteristics associated with the on pixels and off pixels; and classifying the pixel of interest as an edge pixel that is part of a thin line if it is determined that the thin line exists;

(b) processing the image data using a second thin line detection method to determine a second result for the presence of thin lines, the processing comprising:

establishing a window comprising a pixel of interest and neighboring pixels, the window comprising a plurality of predetermined regions;

determining a minimum value and a maximum value of a selected subset of pixels in the window;

thresholding the pixel of interest and neighboring pixels of the window using a first set of thresholds;

counting a number of pixels in each of the predetermined regions of the window after applying the first set of thresholds;

thresholding the counted number of pixels using a second set of thresholds;

determining if a thin line exists in the window based on the thresholding of the counted number of pixels; and classifying the pixel of interest as an edge pixel that is part of a thin line if it is determined that the thin line exists and that the pixel of interest is part of the thin line; and combining the first result and the second result of the processed image data from the first thin line detection method and the second thin line detection method to produce a thin line determination in the image data, wherein each determined thin line comprises at most four pixels along its width.

18. The non-transitory computer-readable medium according to claim 17, wherein the method performed by the computer further includes: upon determining that a thin line exists, determining the orientation of the thin line within the window.

19. The non-transitory computer-readable medium according to claim 17, wherein the method performed by the computer further includes: determining the thresholds for processing the pixel of interest and neighboring pixels in the window for the first thin line detection method based on the minimum and maximum values, or determining the thresholds for processing the pixel of interest and neighboring pixels in the window for the second thin line detection method based on the minimum and maximum values, or both.

20. The non-transitory computer-readable medium according to claim 17, wherein the method performed by the computer further includes, in the first thin line detection method, determining a start location, an end location, and a length of a sequence of on pixels in a row or a column in the binary window.

21. The non-transitory computer-readable medium according to claim 17, wherein the method performed by the computer further includes, in the first thin line detection method, determining a broken sequence in a row or column in the binary window.

22. The non-transitory computer-readable medium according to claim 17, wherein the method performed by the computer further includes, in the first thin line detection method, comparing characteristics associated with the on pixels in each row, or each column, or both, with characteristics among all of the rows, or columns, or both, in the binary window.

23. The non-transitory computer-readable medium according to claim 17, wherein the method performed by the computer further comprises:

processing the image data using image segmentation techniques, and merging the thin line determination with the image data processed using image segmentation techniques.

24. The non-transitory computer-readable medium according to claim 23, wherein the image segmentation techniques include determining data representing a background layer, a selector layer, and a foreground layer of the image data.

\* \* \* \* \*